(12) United States Patent
Broveleit

(10) Patent No.: US 11,004,028 B2
(45) Date of Patent: May 11, 2021

(54) BLOCKCHAIN-BASED LOGISTICS SYSTEMS

(71) Applicant: Chris Broveleit, Richfield, MN (US)

(72) Inventor: Chris Broveleit, Richfield, MN (US)

( * ) Notice: Subject to any disclaimer, the term of this patent is extended or adjusted under 35 U.S.C. 154(b) by 853 days.

(21) Appl. No.: 15/607,187

(22) Filed: May 26, 2017

(65) Prior Publication Data

US 2018/0341910 A1   Nov. 29, 2018

(51) Int. Cl.
*G06Q 10/08* (2012.01)
*G06Q 50/28* (2012.01)
*G06Q 30/00* (2012.01)

(52) U.S. Cl.
CPC ....... *G06Q 10/0833* (2013.01); *G06Q 30/018* (2013.01); *G06Q 50/28* (2013.01)

(58) Field of Classification Search
CPC ... G06Q 10/0833; G06Q 30/018; G06Q 50/28
See application file for complete search history.

(56) References Cited

U.S. PATENT DOCUMENTS

| | | | |
|---|---|---|---|
| 7,430,517 B1 * | 9/2008 | Barton ............. | G06Q 10/06314 705/7.24 |
| 2012/0030133 A1 * | 2/2012 | Rademaker ............ | G06Q 10/08 705/333 |
| 2015/0046236 A1 * | 2/2015 | Boulman ........... | G06Q 30/0208 705/14.11 |
| 2016/0342988 A1 * | 11/2016 | Thomas ............. | G06Q 20/0855 |
| 2018/0144298 A1 * | 5/2018 | Rankin ................. | H04L 9/3236 |
| 2018/0268491 A1 * | 9/2018 | Cuomo .................. | G06Q 40/12 |

OTHER PUBLICATIONS

"Blockchains and Smart Contracts for the Internet of Things" Konstantinos Christidis, May 10, 2016, IEEE Acess (Year: 2016).*

* cited by examiner

*Primary Examiner* — Kevin H Flynn
*Assistant Examiner* — Ismail A Manejwala
(74) *Attorney, Agent, or Firm* — Norton Rose Fulbright US LLP

(57) ABSTRACT

Systems, methods, and computer-readable storage media for managing transport of a commodity from a point of origin to a destination are disclosed. The system receives rating information from one or more logistics service providers and parameters associated with a requested transport of the commodity from a shipper. A quote for the transport of the commodity is dynamically generated based on the rating information and the one or more parameters included in the request, and transmitted to the shipper. The system then receives an authorization to transport the commodity in accordance with the quote from the shipper, and generates one or more smart contracts for the transport of the commodity in response to receiving the authorization. The system monitors the transport of the commodity, and determines whether terms of a smart contract have been satisfied. When a term has been satisfied, operations corresponding to the satisfied terms are performed automatically.

15 Claims, 11 Drawing Sheets

BLOCKCHAIN-BASED LOGISTICS SYSTEMS

TECHNICAL FIELD

The present application is directed to logistics systems, and more particularly system and software architectures providing improvements to logistics systems and their operations.

BACKGROUND

The logistics industry is one of the oldest industries in the world and has become increasingly complex. One aspect contributing to the increasing complexity of the logistics industry is globalization of markets. Large scale manufacturers often produce their goods in particular areas of the world that may be remote to locations where a target consumer population for those goods is located. This may occur for various reasons, such as the cost of labor, availability of materials required to produce the goods, or for other reasons. When this occurs, manufactures must transport the goods to markets where the target consumer population for those goods are located. However, transportation of those goods to the target markets may be difficult due to regulatory compliance requirements imposed on various government entities (e.g., export regulations of the countries where the goods are manufactured and/or import regulations of the countries where the target markets are located), geographical obstacles (e.g., transport of the goods must travel across oceans and/or across large areas of land), and the like.

These complexities have resulted in a plurality of different actors that may engage in various aspects of logistics operations. For example, and referring to FIG. 8, a diagram illustrating various actors involved in the logistics industry is shown. As shown in FIG. 8, the actors may include cargo owners 810 (also referred to as a first party logistics providers or "1PLs"), carriers 820 or "2PLs," logistics service providers 830 (also referred to as third party logistics service providers or "3PLs," and lead logistics providers and consultants 840 (also referred to as fourth party logistics service providers or "4PLs." The cargo owners 810 may provide manufacturing and retailing services, but may lack the infrastructure to transport goods from a manufacturing facility or a warehouse to one or more retail locations. The carriers 820 may provide transportation services for transporting goods from a point of origin to a destination. The logistics services providers 830 may provide logistics services that facilitate transport of goods from a point of origin to a destination. The lead and logistics providers and consultants 840 may provide supply chain management services (e.g., for complex transportation of goods).

In FIG. 8, line 850 represents service integration between the services of the various actors, and line 860 represents supply chain integration. For example, for simple transportation of goods, such as transporting goods from a point of origin to a destination that is relatively close (i.e., no international transport or interstate transport), a cargo owner 810 may work directly with a 1PL to arrange transport of the goods to the destination. For more complex transport of a commodity, such as when the commodity needs to be transported from a first country to a second country, the cargo owner 810 (e.g., a manufacturer or importer) may work with a 3PL or a 4PL who arranges for the transport of the commodity. Additional aspects of logistics operations and interactions between the various entities illustrated in FIG. 8 are described below.

In one example, a manufacturer may turn to 3PLs for assistance in handling the logistics of transporting their goods to the target markets. The 3PLs are entities that have relationships with 2PLs in various markets and arrange transport of goods to the target market by the carriers, or, in some instances, the 3PLs may have a relationship with an agent, and the agent may have the relationships with carriers that may be used to transport the goods to the target markets. For example, a manufacturer operating in China may produce goods and an importer may desire to sell those goods in a target consumer market, which may be located in a foreign country, such as the United States. In this example, the importer may be referred to as a consumer or consignee and the manufacturer may be referred to as a shipper. The consumer may work with a 3PL, which would typically be based in the same country as the consignee (e.g., the United States), but may be located in another country, such as China, to arrange for the transport of goods to the target consumer market. The 3PL then contacts various carriers, or an agent, to arrange for the transport of the goods to the United States, which may include arranging for a first carrier to pick up the goods from the manufacturer and transport the goods to a second carrier. The second carrier may then load the goods on a boat or aircraft and transport them to the target market (e.g., the United States). Upon bringing the goods into the United States, the second carrier may deliver the goods to, or the goods may be picked up by, a third carrier, who then transports the goods to the consignee, after which the consignee may distribute the goods to retail locations in the target markets where they may be used or purchased.

This process suffers from several disadvantages. One area where problems exist with respect to the current state of the logistics industry is cost transparency. For example, and referring briefly to FIG. 9, a consumer of logistics services, such as an importer, may utilize a 3PL to arrange for transport of goods from a point of origin (e.g., a manufacturing facility or warehouse of the manufacturer) to a destination (which may not be a final destination for the goods). The 3PL may in turn utilize an agent that arranges for carriers and vendors (e.g., freight forwarders, etc.) to transport the goods to the destination. In this scenario, the agent pays the carriers and vendors that the vendor worked with for the transportation of the goods to the destination, but marks up the cost of the services provided by those carriers and vendors. This markup is then charged to the 3PL. The 3PL may then apply an additional markup on top of the markup applied by the agent, and charge the consumer the second marked up amount. Depending on the service, the lane, the number of parties involved, and the size of all parties involved, the size margins that sit on top of the actual costs will vary greatly. The consumers are often not aware of the markups applied to the logistics services provided by the 3PL and/or the agent.

In addition to problems associated with elevated costs due to markups, the current state of the logistics industry also creates an opaque and limiting system that is often a finite and secretive network completely dependent on the point of entry, which may be dictated by the selection of the 3PL. That is to say, the options and routings available for selection of asset-based service providers undertaking the transport of goods relies completely on what entities the selected 3PL have a working relationship with. For example, if the selected 3PL does not have a rail contract, they will not quote transport via rail. If they don't have a standard operating agreement with a facility, the consumer may not have the ability to undertake transloading, creative consolidating, and inland delivery. Additionally, the multiple service providers may be hidden from the consumer by both the 3PL and their agent, further empowering the centrally relied upon party, the 3PL, to further inflate costs for the consumer. This limited nature manifests itself in less choice, compliance issues, service limitations, and perhaps cheaper more efficient options being missed.

As briefly mentioned above, another challenge that the logistics industry faces is regulatory compliance. This challenge arises, in part, because many consumers of logistics services must rely on external entities, such as 3PLs and agents, which may engage carriers and vendors located in foreign markets in which the consumer desires to obtain goods from or bring goods into. In such instances, the consumer may be totally reliant on these external entities to make sure that the transportation of their goods is performed in compliance with applicable government regulations and requirements at all points in between the point of origin and the destination. For example, some countries require that every company that has handled a shipment of goods be disclosed to the applicable government agency upon bringing those goods into the country. In many instances, especially where 3PLs and agents are involved, the consumer may not know the identities of all carriers and/or vendors that have handled the shipment (e.g., since these entities are determined and controlled by the 3PLs and agents, rather than the consumer). For example, logistics service providers, such as 3PLs and agents, may operate particular lanes that may be used to transport goods from a point of origin to a destination. These lanes may be direct lanes or indirect lanes. For a direct lane, a single carrier handles the transport of the goods from pickup at the point of origin to delivery of the goods at the destination. It is noted that although a direct lane is provided by a single carrier, the carrier may operate a variety of transport mechanisms, such as one or more trucks, aircraft, and the like, that are used to transport the goods. For an indirect lane, multiple carriers are used to transport the goods from pickup at the point of origin to delivery of the goods at the destination. For example, a first carrier may pick up the goods at the point of origin, transport the goods by land to a port where they are delivered to a second carrier. The second carrier may then transport the goods by boat to a second port (e.g., a port proximate the destination for the goods). A third carrier may then pick up the goods from the second carrier and deliver the goods to the destination. When indirect lanes are used, the consumer may not be aware of the particular carriers involved.

Further, logistics service consumers are often not provided information about operating agreements for the parties involved in transportation of their goods. Information about such agreements would allow the consumer to see which parties have access to more advantageous ports (e.g., ports closer to the destination for the goods), and whether a carrier can pick a shipment of goods up from a port and transport the goods directly to the destination, or if another carrier would need to be involved in transporting the goods to the destination, etc.

Efforts to improve current logistics systems and operations have been the focus of many entities in the logistics industry, however, these efforts have focused on improvements to the traditional model of providing logistics services described. For example, many logistics service providers have made significant investments to secure better rates from carriers. As another example, some logistics service providers have made significant investments to obtain more advantageous lanes. However, none of these efforts have sought to improve the current logistics systems and operations as they apply to the consumers of logistics services.

SUMMARY

Systems, methods, and computer-readable storage media providing an improved hardware and software architecture for providing logistics operations and services are disclosed. In embodiments, a logistics platform is provided. The logistics platform may be configured to provide functionality for supporting various aspects of logistics operations. For example, the logistics platform may be configured to receive rating information from various logistics service providers (e.g., 2PLs, 3PLs, 4PLs, and other actors, such as freight forwarders, transportation insurance providers, and the like). The rating information may specify costs and other parameters associated with different logistics services (e.g., transportation of goods from/to particular destinations via land, air, sea, train, load consolidation and transportation, and the like). Additionally, the logistics platform may be configured to receive requests for quotes for logistics services, and to respond to the requests by dynamically generating quotes based on the rating information input to the system by participating logistics service providers. These aspects of the logistics platform may provide more transparency with respect to costs of various logistics services because the rating information is provided directly to the platform by the end providers (e.g., the rating information may not include markups that are presently charged by certain entities, such as 3PLs and their agents). This may also reduce the costs associated with various logistics services.

The logistics platform may further be configured to implement blockchain technology with respect to aspects of logistics transactions. For example, when a quote is accepted by a 1PL, the logistics platform may dynamically generate a routing for the commodity (e.g., the goods to be transported) that includes one or more smart contracts based on the accepted quote movement. This may include dynamically generating smart contracts between a consumer (e.g., an importer or 1PL) and an operator of the logistics platform, and smart contracts for one or more carriers and other entities (e.g., insurers, freight forwarders, and the like) that may be involved in the routing. In aspects, the smart contracts may facilitate multi-signature transactions, which may provide confidence in the logistics platform and assurance of the execution of aspects of the smart contracts, such as governmental regulatory compliance, payment, on-time delivery, and the like. In additional aspects, the smart contracts may facilitate faster payment to the involved parties and improve operations for proving up regulatory compliance. For example, a first smart contract may be generated and may correspond to a first leg of the routing of the commodity, where the routing is a multi-hop routing. Upon completion of the first leg of the routing, a confirmation may be provided to the logistics platform to indicate that the obligations of the carrier with respect to the first leg have been completed. In response to receiving the confirmation, the blockchain technology may verify that the terms of the smart contract for the first leg have been satisfied, and, upon successful verification of the terms of the smart contract, may initiate a process to provide payment to the first carrier for the transport of the commodity over the first leg of the routing. This process may occur much more quickly than current processes, which often require payments to be distributed upon completion of the entire routing and/or require payments to be made to various entities of which the carrier may be last in line (e.g., because agents responsible for paying the carriers may need to receive payment from a 3PL before they can pay the carriers).

The foregoing has outlined rather broadly the features and technical advantages of the present invention in order that the detailed description that follows may be better understood. Additional features and advantages will be described hereinafter which form the subject of the claims. It should be appreciated by those skilled in the art that the conception and specific embodiment disclosed may be readily utilized as a basis for modifying or designing other structures for carrying out the same purposes of the present application. It should also be realized by those skilled in the art that such equivalent constructions do not depart from the spirit and scope of the application as set forth in the appended claims. The novel features which are believed to be characteristic of embodiments described herein, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present embodiments.

BRIEF DESCRIPTION OF THE DRAWINGS

For a more complete understanding of the disclosed methods and apparatuses, reference should be made to the embodiments illustrated in greater detail in the accompanying drawings, wherein.

It should be understood that the drawings are not necessarily to scale and that the disclosed embodiments are sometimes illustrated diagrammatically and in partial views.

In certain instances, details which are not necessary for an understanding of the disclosed methods and systems, or which render other details difficult to perceive, may have been omitted. It should be understood, of course, that this disclosure is not limited to the particular embodiments illustrated herein.

DETAILED DESCRIPTION

Figure 1:
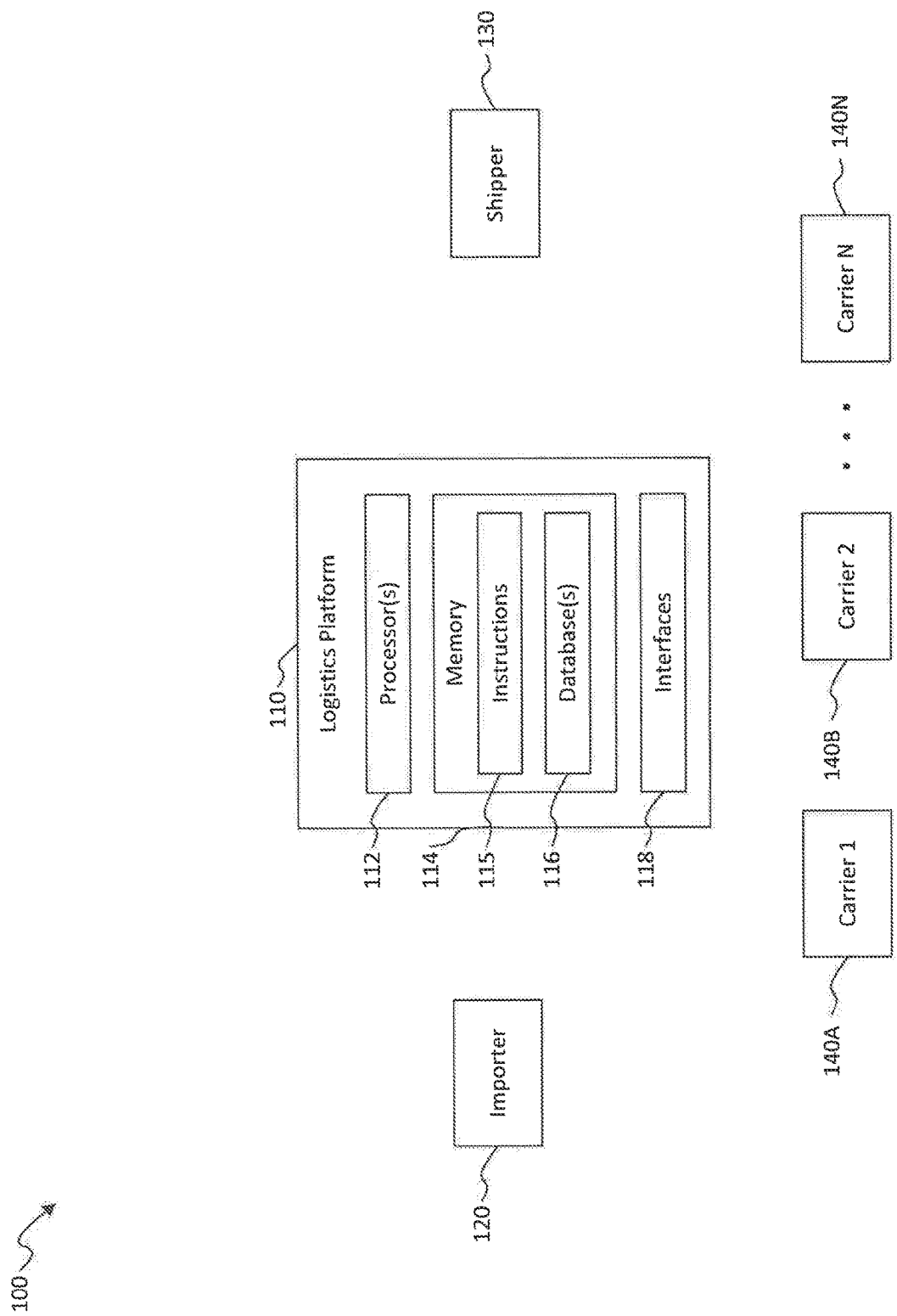
FIG. 1 is a block diagram illustrating aspects of a system for providing logistics operations in accordance with embodiments of the present disclosure.

Referring to FIG. 1, a block diagram illustrating aspects of a system for providing logistics operations in accordance with embodiments of the present disclosure is shown as a system 100. As shown in FIG. 1, the system 100 includes a logistics platform 110, an importer system 120, a shipper system 130, and a plurality of carrier systems 140. The logistics platform 110 includes one or more processors 112, a memory 114, and a plurality of interfaces 118. In embodiments, the memory 114 may store instructions 115 that, when executed by the one or more processors 112, cause the one or more processors 112 to perform operations for providing logistics operations of the logistics platform 110, as described in more detail with respect to FIGS. 1-7, 9, and 10. Additionally, the memory 114 may store one or more databases 116. The one or more databases 116 may be configured to facilitate various operations of the system 100, as described in more detail below.

The plurality of interfaces 118 may include a communication interface, a display interface, one or more input and output (I/O) interfaces, and the like. The communication interface may be configured to communicatively couple the logistics platform 110 to one or more external systems, such as the importer system 120, the shipper system 130, and each of the plurality of carrier systems 140, via one or more networks. For example, the communication interface may be configured to communicatively couple the logistics platform 110 to the one or more external systems via a public network, such as the Internet, via a private network, or a combination of public and private networks, using wired and/or wireless communication links established in accordance with one or more communication protocols (e.g., an Ethernet protocol, an Institute of Electrical and Electronics Engineers (IEEE) 802.11 protocol, a transport control protocol/Internet protocol (TCP/IP) protocol, and the like). The display interface may be coupled to, or include, a display device (not shown in FIG. 1) to facilitate administration and management of the logistics platform 110 by a systems administrator, for example. The one or more I/O interfaces may be coupled to, or include, one or more peripheral devices, such as a printer, a mouse or other pointer device, a keyboard, and the like to facilitate provisioning of inputs to the logistics platform 110 (e.g., during administration and management of the logistics platform 110 by the systems administrator).

It is noted that although FIG. 1 illustrates the logistics platform 110 as a single block, in embodiments, the logistics platform 110 may be provided by a plurality of computing devices, such as in a distributed or cloud-based arrangement. Additionally, although not shown in FIG. 1, the importer system 120, the shipper system 130, and each of the plurality of carrier systems 140 may include components similar to one or more of the components of the logistics platform 110, such as processors, memory, and the interfaces described above with respect to the logistics platform 110. However, each of these systems will be configured to perform operations tailored to aspects of logistics operations associated with their respective operators, as described in more detail below. For example, the importer system 120 may include one or more processors and a memory storing instructions that, when executed by one or more processors of the importer system 120, may cause the one or more processors to perform operations for providing logistics operations of an importer that operates the importer system 120. Similarly, the shipper system 130 and each of the plurality of carrier systems 140 may each include one or more processors and a memory storing instructions that, when executed by one or more processors of the respective system, may cause the one or more processors to perform operations for providing logistics operations in support of the entity operating a particular system. Additionally, it is noted that although FIG. 1 illustrates the system 100 as including a plurality of carrier systems 140 (e.g., N carrier systems including a first carrier system 140A, a second carrier system 140B, . . . , and an Nth carrier system 140N), in embodiments, the system 100 may include one or more carrier systems.

Figure 2:
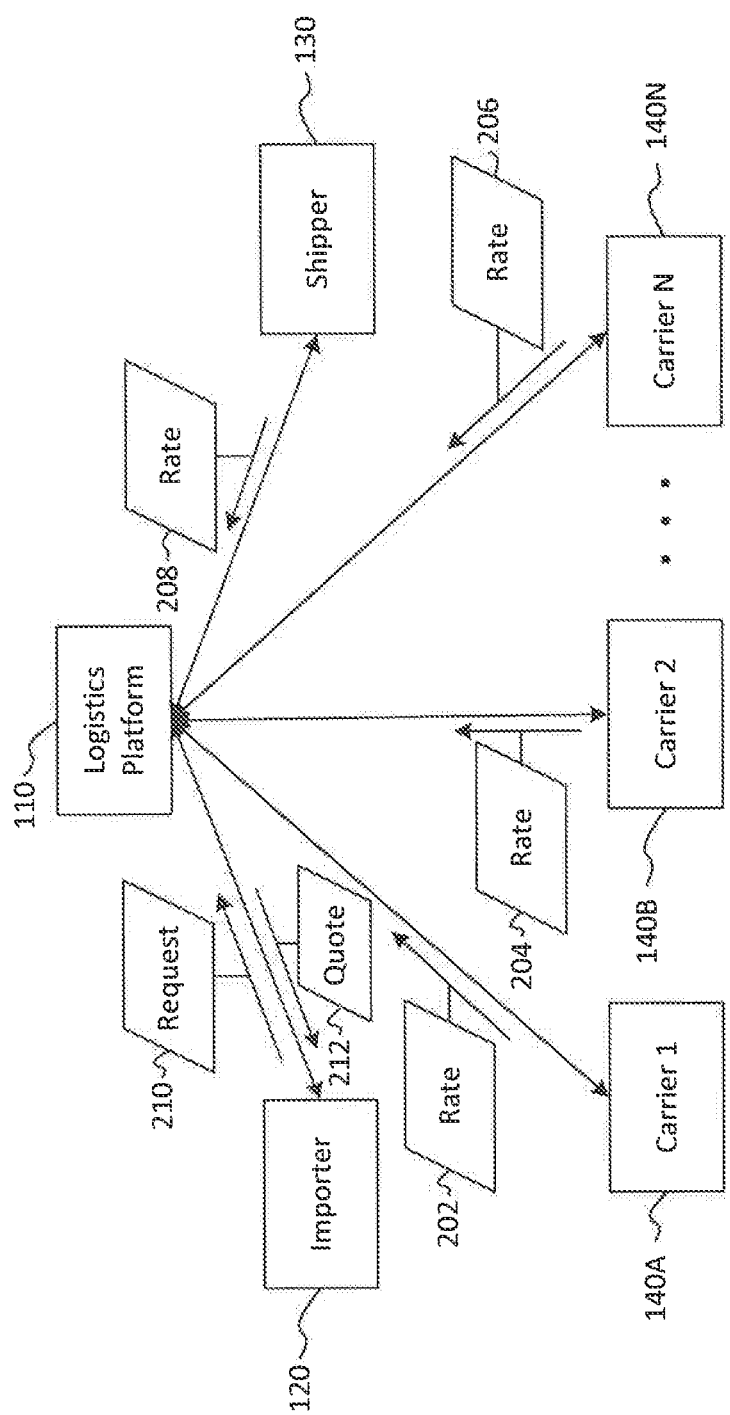
FIG. 2 is a block diagram illustrating aspects of logistics operations provided by a logistics platform in accordance with embodiments of the present disclosure.

The system 100 may be configured to provide various functionality to support logistics operations with respect to a plurality of consumers, shippers and logistics service providers. For example, and referring to FIG. 2, a block diagram illustrating aspects of logistics operations provided by the logistics platform 100 in accordance with embodiments of the present disclosure is shown. As shown in FIG. 2, rating information may be communicated to the logistics platform 110 from systems associated with various logistics service providers and other entities associated with providing logistics services via the logistics platform 110. For example, the first carrier system 140A may provide rating information 202 to the logistics platform 110, the second carrier system 140B may provide rating information 205 to the logistics platform 110, the Nth carrier system 140N may provide rating information 206 to the logistics platform 110, and the shipper carrier system 130 may provide rating information 208 to the logistics platform 110. It is noted that in addition to receiving rating information from carriers, the logistics platform 110 may also receive rating information for services provided by various vendors, such as entities that provide export declaration and/or import clearance services, services for payment of duties and taxes, and/or other services, such as insurance. In aspects, the logistics platform 110 may be configured to periodically (e.g., daily, weekly, monthly, quarterly, etc.) probe the logistics service providers for updated or current rating information. For example, the logistics platform 110 may periodically transmit messages to the logistics service provider systems requesting updates to the rating information. In additional aspects, the logistics service providers may periodically (e.g., as rate information changes) upload updated rating information to the logistics platform. For example, when rates for one or more logistics services change, the updated rating information for those services may be provided to the logistics platform 110. By periodically updating the rating information stored in the database(s) 116 of the logistics platform 110, the rating information may be updated in near real-time (e.g., as little as a few minutes to a few hours), allowing quotes to be generated by the logistics platform 110 based on more accurate rating information.

The rating information 202-206 may include information associated with one or more types of freight transportation services offered by each of the carriers associated with carrier systems 140A-140N and/or vendors (not shown in FIG. 1), and the rating information may be stored in database 116 of the logistics platform 110, and, as described in more detail below. Thus, the database 116 may provide a centralized repository for information regarding different logistics services and the logistics service providers offering those services. For example, a first logistics service provider may provide truck-based freight transportation services, rail-based freight transportation services, and air-based freight transportation services, while a second logistics service provider may provide boat-based freight transportation services. The ratings information stored in database 116 may reflect the different types of freight transportation services offered by each of the logistics service providers.

The rating information received from the logistics service providers may additionally include information that indicates different types of equipment available for particular logistics services. For example, the information regarding the different types of equipment available for particular logistics services may indicate container sizes available for particular services offered by one or more of the logistics service providers, information about whether the carrier supports less than container shipments or other containerless transportation services (e.g., air freight). For example, truck-based freight transportation services are designed to transport freight over land, but different types of trucks may be used depending on the distance of the shipment, the size of the shipment, etc. Where a logistics service provider uses different types of trucks, such as box-truck, semi-tractor trailer truck, and other truck-based freight transportation services, for different types of truck-based freight transportation services, different containers (e.g., types and sizes of containers) may be required for each of the different truck types. Containers may also differ between different types of freight transportation services. For example, rail-based freight transportation services may utilize a container that is different from containers utilized in other types of freight transportation. Thus, for each type of freight transportation service, one or more container sizes supporting each type of freight transportation service may be identified by the rating information. Additionally, the rating information may indicate other parameters for particular freight transportation services, such as whether a container is required at all.

The rating information may further identify one or more lanes in which the different logistics service providers operate, and may further include information that correlates particular types of freight transportation services and corresponding container requirements (e.g., whether a container is required and if so, the available container size(s)) to particular lanes. For example, a logistics service provider may operate in a first lane in which the logistics service provider offers truck-based freight transportation services and rail-based freight transportation services using one or more container types and sizes, and may operate in a second lane in which the logistics service provider offers boat-based freight transportation services. Each of these different services may be container-less (e.g., do not require a container) or may utilize one or more container types and sizes. The rating information may further identify points of origin and destinations serviced by the logistics service providers. The points of origin and destinations may indicate whether a logistics service provider is capable of taking possession of the commodity to be transported at particular locations, such as ports, rail stations, airports, and the like.

The logistics platform 110 may be configured to derive time estimates associated with transport of commodities from the points of origin to the destinations based on information stored at the database(s) 116. For example, the logistics platform 110 may track travel and delivery times for various logistics services executed through the logistics platform 110, as described in more detail below, and may store information associated with the travel and delivery times at the database(s) 116. Based on the travel and delivery time information stored at the database(s) 116, the logistics platform may estimate a time frame for completing a requested routing. This may allow the logistics platform to predict whether particular logistics service providers are likely to meet any time frame parameters of a requested routing of a commodity. For example, where a request for transport of a commodity includes a parameter indicating the delivery needs to be completed within ten days, the logistics platform may provide one or more quotes corresponding to routings predicted to satisfy the time parameter (e.g., each of the one or more quotes may comprise a routing that utilizes one or more logistics service providers and the total time predicted time to complete the routing satisfies the time parameter of the request).

The rating information may be utilized by the logistics platform 110 to dynamically generate quotes for logistics services in response to requests from one or more entities, such as an importer operating the importer system 120. For example, as shown in FIG. 2, the importer system 120 may transmit a request 210 to the logistics platform 110. The request 210 may include one or more parameters identifying various parameters of a requested routing of a commodity from a point of origin to a destination. For example, the parameters of the request 210 may include equipment parameters (e.g., parameters indicating a size of a container to be used for the routing, a number of pieces of the commodity to be transported, dimensions of the commodity and/or each piece of the commodity, a weight of the commodity and/or each piece of the commodity, and the like), information identifying the commodity (e.g., they type, quantity, value, or other features of the commodity, which may include items of different types, sizes, weights, dimensions, etc.), a point of origin corresponding to a starting point for the routing (e.g., a location where the commodity is to be picked up to begin the transport of the commodity), a destination for the commodity (e.g., a final destination for delivery of the commodity, an intermediate destination, such as where the commodity is to be delivered to a particular location other than the final destination, etc.), information regarding whether the commodity may be transported as a consolidation, a preferred lane for the transport of the commodity, a time constraint for delivering the commodity to the destination (e.g., a date upon which the commodity needs to be delivered to the destination), parameters indicating a service level and/or special considerations for the commodity (e.g., hazardous, food grade, bagged goods, non-stackable, and the like etc.), other parameters, or a combination thereof.

In response to receiving the request 210, the logistics platform 110 may initiate operations to generate a quote 212. In aspects, the quote 212 may be dynamically generated based on the rating information (e.g., the rating information 202-208) and the one or more parameters included in the request. For example, the logistics platform 110 may analyze the one or more parameters and the rating information to determine a set of carriers (e.g., one or more of the N carriers corresponding to the carriers operating the carrier systems 140A-140N) capable of handling one or more legs of the routing from the point of origin to the destination. For example, the request 210 may be a request to move a twenty foot container from Minneapolis, Minn. to Barcelona, Spain. In this example, the routing may require a plurality of legs. The plurality of legs may include a first leg associated with transportation of the commodity from Minneapolis, Minn. to a port, such as a port in Montreal, Canada, a second leg associated with loading the commodity onto boat and delivering them to a port in Spain, and a third leg associated with receiving the commodity at the port in Spain and transporting them to the destination in Barcelona, Spain. In aspects, the set of carriers may include carriers that can perform transportation operations for one or more of the legs of the move. For example, the logistics platform 110 may identify: two carriers capable of handling logistics operations for the first leg of the move, such as providing a twenty foot container at the point of origin, loading the container, and transporting the container to the port in Montreal; one carrier capable of handling the second leg, such as receiving the commodity at the port and loading it onto a boat for transport to the port in Spain; and four carriers capable of handling the third leg, such as taking possession of the commodity at the port in Spain and delivering it to the destination in Barcelona. It is noted that in some aspects, one or more of the legs may require additional services, such as export declaration, import clearance, payment of duties and taxes, as well as any regulatory compliance needed along the way. In such instances, the logistics platform 110 may also determine one or more vendors (not shown in FIGS. 1 and 2) capable of providing those services for the move. In aspects, the logistics platform 110 may seek to minimize the number of different carriers utilized for the move. For example, after determining the set of carriers capable of handling the one or more legs of the move, the logistics platform 110 may then determine whether a single carrier from among the set of carriers can handle multiple legs of the move.

After identifying the set of carriers, and determining whether any direct lanes are available for the move (i.e., can the transport of the commodity be executed by a single carrier), the logistics platform 110 may generate one or more routings. In aspects, the routing(s) may indicate quotes for the one or more carriers that are to handle the transport of the commodity, the particular transport methods to be utilized during each leg of the move (e.g., truck, rail, boat, air, and the like), and the cost associated with the logistics services provided by each party. In aspects, different routings may have different pricing depending on the particular transport methods utilized, the carriers involved, and the like. After generating the routing(s), the logistics platform may transmit the routing(s) (e.g., quotes for one or more carriers to transport a commodity) to the consumer that requested the quote, which, in FIG. 2, is the importer operating the importer system 120.

In aspects, the routing(s) may identify the carriers that are responsible for each leg of the quoted move, the cost associated with each party's services for each leg of the move, and the like. In this manner, the consumer (e.g., the party requesting the transport of commodity) may more readily comply with certain government regulations, such as regulations that require the consumer to disclose all parties that have handled the transport of the commodity. This is an improvement over existing logistics quoting processes and services, which often hide the identities of the parties involved in a quoted move, as well as the costs associated with each party's involvement in different phases of the transport of the commodity. Additionally, because the quotes provided by the logistics system 110 are transparent with respect to the identities of the parties involved and the costs associated with the different phases or legs of the move, costs associated with transport of a commodity may be decreased (e.g., because the carriers and other vendors are incentivized to provide lower prices to win the business of the consumer). Further, the gate keepers (e.g., the 3PLs) that maintain the opacity and charge for their networking services via marking up the freight of the consolidated services they are offering may be eliminated.

Figure 3:
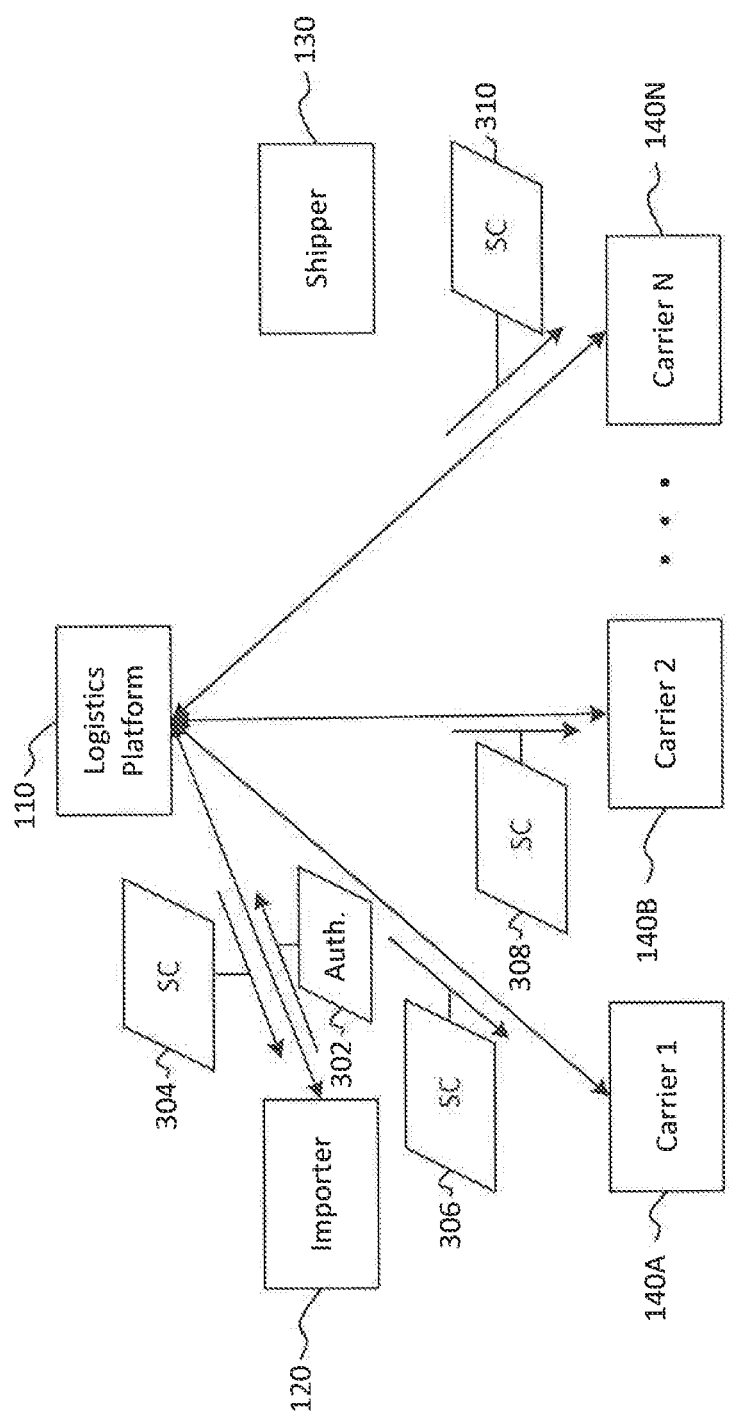
FIG. 3 is a block diagram illustrating aspects of logistics operations provided by a logistics platform in accordance with embodiments of the present disclosure.

The consumer receives the quotes, such as the quote 212, from the logistics platform and may select a particular one of the quotes (if multiple quotes are provided) for the requested transport of the commodity. In response to selecting the quote, the consumer may initiate transmission of an authorization message to the logistics platform 110. For example, and referring to FIG. 3, the consumer system (e.g., importer system 120 of FIGS. 1-3) may transmit an authorization message 302 to the logistics platform 110. Upon receiving the authorization message 302, the logistics platform 110 may implement blockchain technology to generate a plurality of smart contracts. For example, as shown in FIG. 3, a smart contract 310 may be generated and communicated to the Nth carrier 140N, a smart contract 308 may be generated and communicated to the carrier 140B, a smart contract 306 may be generated and communicated to the carrier 140A, and a smart contract 304 may be generated and communicated to the consumer (e.g., importer system 120). Each of the smart contracts may include one or more milestones and one or more operations that are automatically executed by the logistics platform in response to a determination that at least one of the milestones of the smart contract has been completed. In aspects, the smart contracts may be written to one or more blocks of blockchain in addition to, or as an alternative to, transmitting the smart contracts to the parties involved. If the smart contracts are written to the blockchain as an alternative to transmitting the smart contracts to the various parties involved in the transport of the commodity, information associated with the smart contracts, such as information identifying milestones and other terms of the smart contract, may be communicated to the various parties. In aspects, the blockchain may provide a ledger that may be specific to the logistics platform 110. For example, in aspects, the one or more routings generated by the logistics platform in response to the request 202 may be written to a first block of the blockchain. In aspects, the first block may be timestamped. In aspects, the first block may include a link to a prior block in the blockchain, such as a hash of the prior block. Linking each block added to the blockchain provides traceability of the transactions recorded therein. Once the consumer transmits the authorization message 302 selecting a particular routing, a second block may be added to the blockchain, where the second block indicates the particular routing selected or authorized by the consumer. In aspects, the second block may be timestamped. In aspects, the second block may include a link to a prior block in the blockchain, such as a hash of the prior block. In aspects, the first block (e.g., the block comprising information regarding the quoted routings) may not be the prior block referenced in the second block, such as where additional quoted routings were generated by the logistics platform 110 prior to receiving the authorization message 302. By linking the blocks of the blockchain to each prior block, a block comprising the information associated with the selected routing may be traced back to the block comprising the quoted routing. This may instill trust in the parties that prices are not being manipulated after the particular routing is selected by the consumer. In additional or alternative aspects, the blockchain ledger may be implemented using a third party blockchain technology provider, such as Bitcoin or Etherium.

In aspects, the one or more milestones of the smart contracts generated by the logistics platform 110 may correspond to various operations executed by the carriers during the transport of the commodity. For example, a first smart contract (e.g., the smart contract 310) may include a milestone corresponding to pickup of the commodity by a carrier (e.g., an operator of the Nth carrier system 140N) at a shipper (e.g., the shipper associated with shipper system 130 of FIGS. 1-3), and may include a second milestone associated with delivery of the commodity to an intermediate carrier (e.g., a carrier that is to transport the commodity along a second leg of the transport of the commodity), such as at a rail station, port, or airport. The first smart contract may further include operations that are to be executed upon completion of one or more of the milestones. For example, operations included in the first smart contract may specify that the first carrier is to be paid upon delivery of the commodity to the second carrier (e.g., upon completion of the second milestone). In aspects, smart contracts may also be generated for one or more vendors involved in the transport of the commodity, such as smart contracts to vendors that will assist with import and export aspects of the transport of the commodity, regulatory compliance aspects of the transport of the commodity, or other logistics services.

The logistics platform 110 may be configured to monitor a status of the one or more milestones of each issued smart contract for indications that one or more milestones have been completed, and, upon determining that particular milestones have been completed with respect to particular smart contracts, may automatically execute any operations specified in the smart contracts. For example, upon detecting, based on the monitoring, that the first carrier has delivered the commodity to the second carrier, the logistics system 110 may execute the operations of the first smart contract associated with the second milestone (e.g., delivery of the commodity to the second carrier).

In aspects, the operations of the smart contracts may include program code that may be executed to perform the operations of the smart contract. For example, the smart contracts are implemented using blockchain technology and, upon receiving the authorization message 302, the smart contracts generated by the logistics platform 110 may be entered into the blockchain ledger. Upon detecting that a milestone has been completed, the logistics platform 110 may access the blockchain ledger to obtain the program code corresponding to the completed milestone and execute the program code to perform the operations corresponding to the milestone. Upon completing the operations, the blockchain ledger may be updated to reflect that a particular milestone and its corresponding operations have been completed. In aspects, operations that provide payment in response to completion of a milestone may be performed using a digital cryptocurrency, such as bitcoins, ether, and the like.

In aspects, milestones may be associated with multiple conditions that must be satisfied before the operations are performed. For example, the smart contract issued to the first carrier included a first milestone corresponding to pickup of the commodity from the shipper, and a second milestone associated with delivery of the commodity to a second carrier. In this example, the logistics platform 110 may verify that the first milestone has been completed prior to performing the operations associated with the second milestone. Upon receiving confirmation that the first carrier has picked up the commodity from the shipper, the logistics platform 110 may make an entry in the blockchain ledger to indicate that the first milestone has been completed. Subsequently, when the second milestone is completed, the logistics platform 110 may verify that the first and second milestones of the smart contract have been completed successfully prior to executing the program code to initiate payment to the first carrier. In aspects, the payment to the first carrier may be initiated from the consumer (e.g., the operator of the importer system 120). Thus, in some aspects, the authorization message 302 received from the consumer may provide information regarding a method of payment to be used and information authorizing the logistics platform 110 to initiate the payment on behalf of the consumer. In aspects, operations that are performed with respect to a smart contract issued to a single carrier may include multiple payment points, such as where the carrier is responsible for handlings multiple legs of the transport of the commodity.

Figure 4:
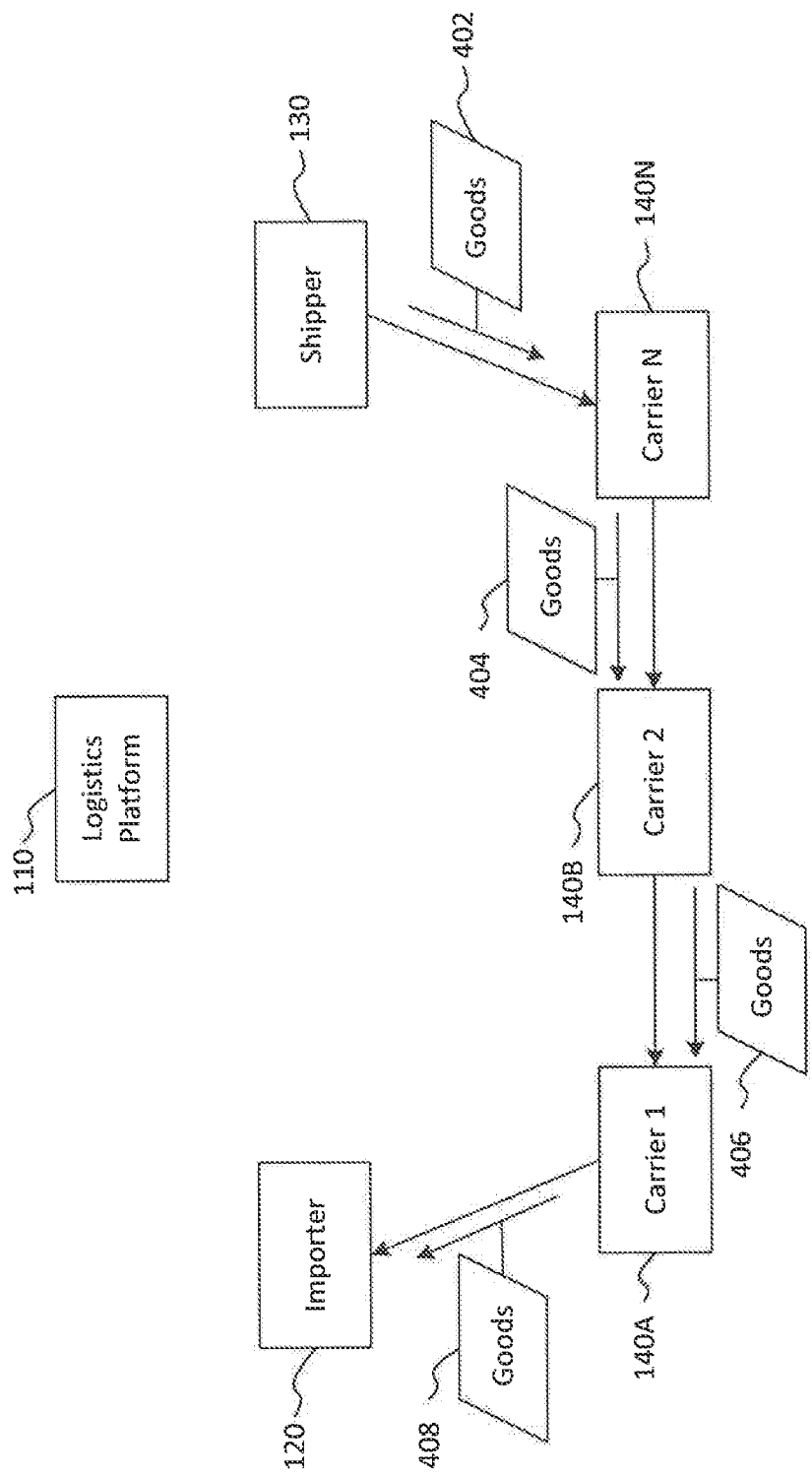
FIG. 4 is a block diagram illustrating aspects of logistics operations provided by a logistics platform in accordance with embodiments of the present disclosure.

An exemplary scenario for transporting a commodity, monitoring milestones, and initiating payments upon milestone completion is described below with reference to FIGS. 4-6. Referring to FIG. 4, a carrier (e.g., the Nth carrier 140N of FIGS. 1-6) may be responsible for taking possession of a shipment of a commodity from a shipper (e.g., an operator of shipping system 130), as illustrated at 402. In aspects, upon taking possession of the commodity from the shipper, the shipper and/or the carrier may notify the logistics platform 110. The logistics platform 110 may, upon receiving the notification(s), update information stored on the blockchain ledger for one or more smart contracts to indicate that carrier has taken possession of the commodity. In aspects, handing over possession of the commodity to the carrier may correspond to a milestone of a smart contract issued to the shipper. In such instances, the logistics platform 110 may check the blockchain ledger and update the ledger to indicate that the milestone has been completed. If the milestone is associated with any operations, such as payment to the shipper for the commodity by the consumer, the logistics platform 110 may initiate execution of the payment and funds may be transferred from the consumer to the shipper. It is noted that in aspects, execution may occur automatically upon updating the smart contract information on the blockchain ledger to indicate that the milestone has been completed. Additionally, taking possession of the commodity may be a first milestone of a smart contract issued to the carrier, where a second milestone of the contract may correspond to delivering possession of the commodity to a second carrier (e.g., the carrier 140B of FIGS. 1-6).

After taking possession of the commodity, at 402, the carrier may transport the commodity along a first leg of the move, as indicated at 404, and may deliver the commodity to the second carrier. In aspects, the carrier may provide documentation to the second carrier (e.g., a bill of lading) and the second carrier may sign the documentation to signify that the carrier has successfully delivered the commodity to the second carrier and that the second carrier now has possession of the commodity. In aspects, the documentation signed by the second carrier may be a physical document. In other aspects, the documentation may be a digital document and the second carrier may digitally sign the documentation. In aspects, the logistics platform 110 may monitor for successful completion of the second milestone associated with the smart contract issued to the carrier by monitoring for a confirmation message.

Figure 5:
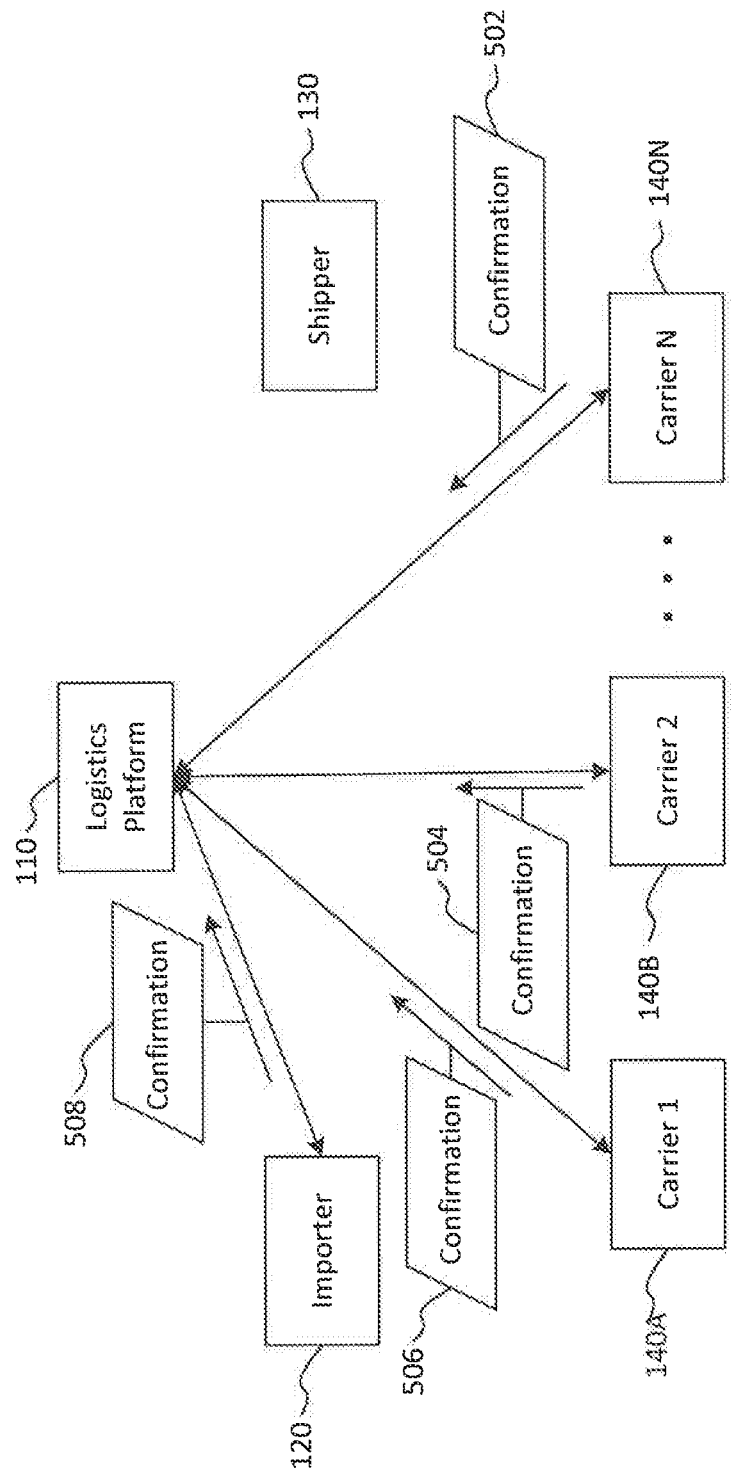
FIG. 5 is a block diagram illustrating aspects of logistics operations provided by a logistics platform in accordance with embodiments of the present disclosure.
Figure 6:
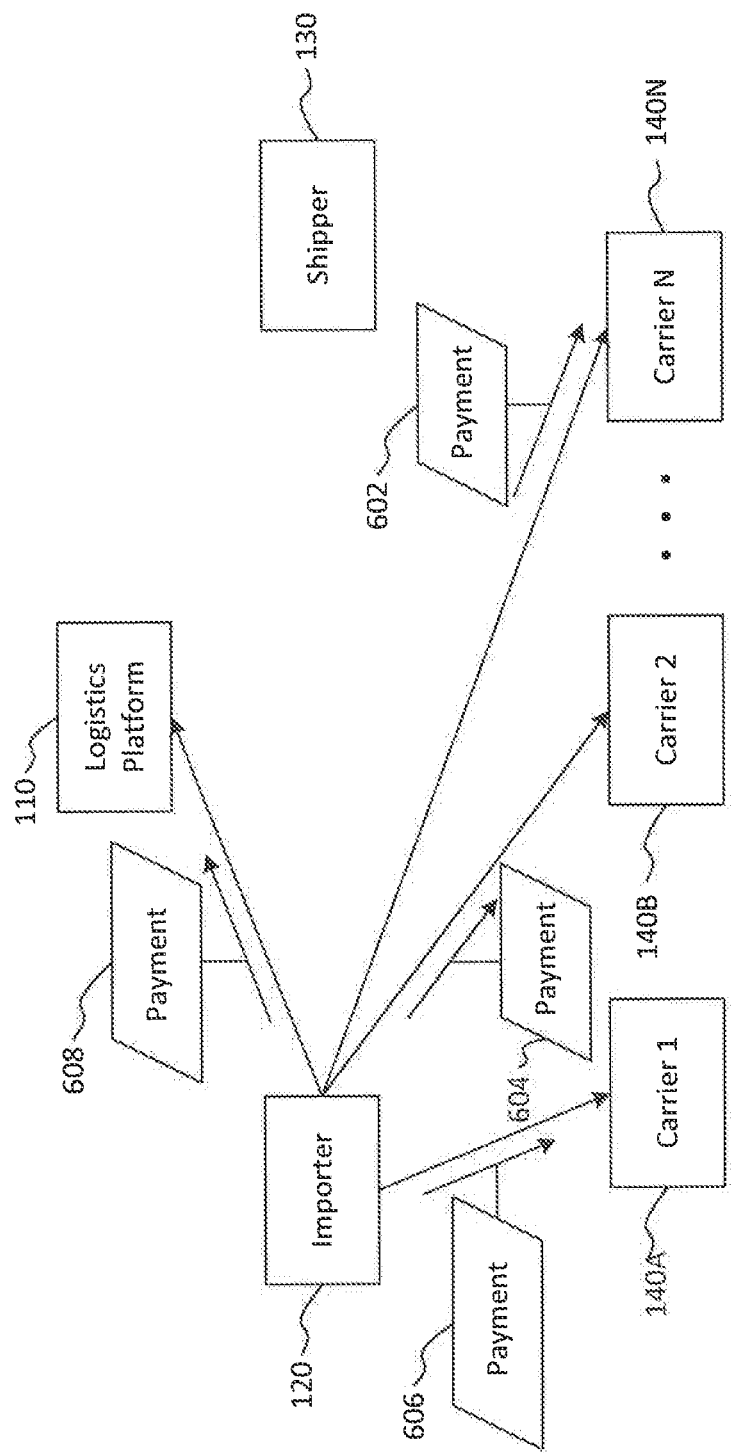
FIG. 6 is a block diagram illustrating aspects of logistics operations provided by a logistics platform in accordance with embodiments of the present disclosure.

For example, as illustrated in FIG. 5, the carrier may transmit a confirmation message 502 to the logistics platform 110. In aspects, the confirmation message 502 may include a copy of the signed documentation obtained by the carrier upon transfer of the commodity to the second carrier. In aspects, the copy may be a digital copy of a physical document that has been signed by the second carrier. In aspects, the copy may be a copy of a digital document that has been digitally signed by the second carrier. Upon receiving the confirmation message 502, the logistics platform 110 may update the blockchain ledger with respect to the smart contract issued to the carrier to indicate that the carrier has successfully delivered possession of the commodity to the second carrier, and may also update the blockchain ledger to indicate that the second carrier has taken possession of the commodity. In aspects, the delivery of the commodity to the second carrier may correspond to a second milestone of the smart contract issued to the carrier, and the second milestone may be associated with operations to initiate payment to the carrier. Thus, upon updating the blockchain ledger to indicate that the second milestone was completed successfully, the code corresponding to operations associated with the second milestone of the smart contract may be executed to provide payment to the carrier for the first leg of the move. This is illustrated in FIG. 6, at 602, where a payment is issued to the carrier using funds associated with the consumer (e.g., the operator of the importer system 120). As explained above, in aspects, the payment may be made using a digital currency. In aspects, in order to streamline the payment process, each logistics service provider may maintain a blockchain wallet for one or more digital currency platforms. In some aspects, the payment may be initiated using another payment mechanism, such as a credit card charge, a wire transfer, and the like. In aspects, the payment to the carrier may be recorded in the blockchain ledger.

Referring back to FIG. 4, the second carrier may take delivery of the commodity from the carrier and may transport the commodity to a third carrier (e.g., a carrier associated with the carrier system 140A), as indicated at 406. Upon successful delivery to the third carrier, the second carrier may present one or more documents (e.g., bills of lading, etc.) to the third carrier for signature, and, upon obtaining the signature of the third carrier, may provide a confirmation message to the logistics platform 110, as indicated by confirmation message 504 of FIG. 5. Similar to the operations described above with respect to the confirmation message 502, upon receiving the confirmation message 504, the logistics platform 110 may update the blockchain ledger with respect to the smart contract issued to the second carrier to indicate that the second carrier has successfully delivered possession of the commodity to the third carrier, and may also update the blockchain ledger to indicate that the third carrier has taken possession of the commodity. In aspects, the delivery of the commodity to the third carrier may correspond to a second milestone of the smart contract issued to the second carrier (i.e., taking possession of the commodity may correspond to a first milestone of the smart contract issued to the second carrier), and the second milestone may be associated with operations to initiate payment to the second carrier. Thus, upon updating the blockchain ledger to indicate that the second milestone was completed successfully, the code corresponding to operations associated with the second milestone of the smart contract issued to the second carrier may be automatically executed to provide payment to the second carrier for the second leg of the move. This is illustrated in FIG. 6, at 604, where a payment is issued to the second carrier using funds associated with the consumer (e.g., the operator of the importer system 120). As explained above, in aspects, the payment may be made using a digital currency, a credit card, a wire transfer, or another form of payment. In aspects, the payment to the second carrier may be recorded in the blockchain ledger.

Referring back to FIG. 4, the third carrier may take delivery of the commodity from the second carrier and may transport the commodity to the destination point (e.g., a consumer associated with the importer system 120), as indicated at 408. Upon successful delivery of the commodity to the destination point, the third carrier may present one or more documents (e.g., bills of lading, etc.) to the consumer for signature, and, upon obtaining the signature of the consumer, may provide a confirmation message to the logistics platform 110, as indicated by confirmation message 506 of FIG. 5. Similar to the operations described above with respect to the confirmation messages 502, 504, upon receiving the confirmation message 506, the logistics platform 110 may update the blockchain ledger with respect to the smart contract issued to the third carrier to indicate that the third carrier has successfully delivered possession of the commodity to the consumer, and may also update the blockchain ledger to indicate that the consumer has taken possession of the commodity. In aspects, the delivery of the commodity to the consumer may correspond to a second milestone of the smart contract issued to the third carrier (i.e., taking possession of the commodity may correspond to a first milestone of the smart contract issued to the third carrier), and the second milestone may be associated with operations to initiate payment to the third carrier. Thus, upon updating the blockchain ledger to indicate that the second milestone was completed successfully, the code corresponding to operations associated with the second milestone of the smart contract issued to the third carrier may be automatically executed to provide payment to the third carrier for the third and final leg of the move. This is illustrated in FIG. 6, at 606, where a payment is issued to the third carrier using funds associated with the consumer (e.g., the operator of the importer system 120). As explained above, in aspects, the payment may be made using a digital currency, a credit card, a wire transfer, or another form of payment. In aspects, the payment to the third carrier may be recorded in the blockchain ledger.

In aspects, the monitoring by the logistics platform 110 may be configured to determine whether one or more time constraints associated with the transport of the commodity were satisfied. In aspects, the time constraints may be specified in one or more of the smart contracts issued to the carriers. If the time constraints specified for a particular carrier are satisfied, this may result in payment of a first amount to the particular carrier, and the time constraints are not satisfied, the particular carrier may be paid a reduced amount. That is to say that penalties may be automatically imposed on the particular carrier by using time constraints included in the smart contract. In aspects, multiple time constraints may be imposed in a smart contract. For example, a first time constraint may correspond to an on-time delivery of the commodity by the particular carrier and may result in full payment, a second time constraint may correspond to a first late delivery of the commodity and may reduce the full payment amount by a first amount, and a third time constraint may correspond to a second late delivery of the commodity and may reduce the full payment amount by a second amount that is larger than the first amount. In aspects, the amount of the penalty may be tied to a number of days that the carrier is late with respect to the delivery of the commodity for a particular milestone, as opposed to different time constraint parameters, and the smart contract operations may include code for calculating the amount of the reduction imposed for late delivery.

In aspects, after the consumer takes delivery of the commodity at the destination, the consumer may provide a confirmation message 508 to the logistics platform, and, upon receiving the confirmation message 508, the logistics platform 110 may update the blockchain ledger with respect to the smart contract issued to the consumer to indicate that the consumer has successfully taken possession of the commodity from the third carrier. Additionally, the logistics platform 110 may also update the blockchain ledger to indicate that a milestone was completed successfully (e.g., the consumer received the commodity), the code corresponding to operations associated with the milestone of the smart contract issued to the consumer may be automatically executed to provide payment to the logistics platform 110. This is illustrated in FIG. 6, at 608, where a payment is issued to the logistics platform 110 using funds associated with the consumer (e.g., the operator of the importer system 120). As explained above, in aspects, the payment may be made using a digital currency, a credit card, a wire transfer, or another form of payment. In aspects, the payment to the third carrier may be recorded in the blockchain ledger.

Additionally, it is noted that the exemplary operations described above with reference to FIGS. 4-6 are provided for purposes of illustration, rather than by way of limitation, and that other entities, smart contracts, operations and milestones may be involved in a particular transport of commodity. For example, as explained above, the transport of the commodity may include smart contracts issued to one or more vendors responsible for various asset-based services and logistics professional services, such as clearance of the commodity through customs in one or more countries, picking up the commodity from the shipper and repackaging them in a manner that is appropriate for the particular type(s) of transport to be used for the move, and the like. In such instances, these additional operations may be monitored by the logistics platform 110 (e.g., via confirmation messages or another type of monitoring mechanism, such as pictures uploaded to the platform, global positioning system (GPS) information, radio frequency identification (RFID) tracking information, and the like), and as each milestone associated with these smart contracts is completed, additional operations may be implemented or executed by the logistics platform 110 or directly through the code stored on the associated entries in the blockchain.

As the various phases of the transportation of the commodity are executed, the logistics platform 110 may be configured to generate analytics information associated with the involved parties. For example, the logistics platform 110 may track and/or generate analytics information that indicates how long it takes each entity to complete their portions of transport transactions, how many insurance claims a particular party has made, a number of missed deliveries, and the like. In aspects, the logistics platform 110 may provide a tool, such as a standalone application that may be downloaded by parties served by the logistics platform or a web-based application. The application may enable the parties to provide feedback and/or ratings for other parties involved in various logistics operations provided through the logistics platform. For example, a first carrier may deliver the commodity to a second carrier, and the second carrier may access the application to provide feedback on the first carrier, such as to indicate whether the commodity was damaged when the second carrier took possession, whether the first carrier was late delivering the commodity, whether portions of the commodity were missing (e.g., 10 pieces were to be delivered, but only 8 were received), or other feedback. In aspects, the feedback may be viewable by each of the parties involved in the routing after each party completes their portion of the touring.

In aspects, this information may be stored in the database(s) 116 of the logistics platform 110 and considered when generating the one or more routings (e.g., the quotes described above with reference to FIGS. 1 and 2). For example, when a request for quote is received and includes one or more parameters associated with time constraints, carriers and/or vendors associated with analytics information that indicate they will not be able to satisfy the time constraints for the requested move may be excluded from the one or more generated quotes. Additionally, the logistics platform 110 may generate analytics information representative of pricing trends for rates associated with various logistics operations of the entities served by the logistics platform. The logistics platform 110 may be configured to periodically analyze this information to identify possible inconsistencies in the rates provided by particular carriers/vendors. For example, if a carrier published rating information indicating a particular move would cost a first amount, and then changes the cost for the particular move to a second amount, this may indicate that the particular carrier is attempting manipulate pricing (e.g., either an increase in pricing to make more profits or a decrease in pricing to win more business). In aspects, if the change in price is greater than a threshold amount, the logistics platform 110 may flag the change for further inquiry. In aspects, flagged rate changes may cause the logistics platform 110 to generate a message to the associated entities to verify that the change was not made in error and/or to acquire additional information about the cause of the change. If the change was made in error, the entity may submit corrected information, which may then cause the flag to be released, at which time the corrected information may be used to generate one or more quotes. It is noted that the logistics platform 110 may be configured to track/monitor additional metrics associated with various aspects of logistics operations and that the particular examples described above have been provided for purposes of illustration, rather than by way of limitation.

In aspects, the logistics system 110 may be configured to provide quotes for other types of transportation of commodity, such as consolidations. A consolidation is the lumping of freight from various shippers going to various consignees all under one masterbill of lading. "Underneath" the master will be various housebills of lading representing the individual moves that compiled together will represent the pieces and weight of the entire consolidation. Ocean consolidations, also known as less than container loads (LCLs), take place in twenty and forty foot containers, in trucking it is a less than load (LTL) service on fifty-three foot trucks or sprinters, and for air freight it is the construction of an air pallet or simply the tendering of multiple pieces of freight all labeled with the same master airway bill number. The capacity to support consolidations via the logistics platform 110 may provide significant savings to consumers for certain moves. For example, this enables consumers to contract logistics at a bulk price with the carriers while selling at a micro-price.

To facilitate consolidations, the logistics platform 110 may be configured to identify regular freight that is being moved in particular sizes and/or quantities based on inputs (e.g., requests) of various consumers in the marketplace. Once identified, the logistics platform 110 may group particular requests to transport freight with other requests in an effort to fill a particular container (e.g., a twenty foot container for an ocean consolidation, etc.). In aspects, these consolidations may occur over one or more legs of a transport. For example, the logistics platform may determine that a move may need to be initiated as a LTL move by a first carrier, and that once the LTL load is delivered to a second carrier, the freight may be grouped with other freight to form an air pallet or fill a twenty foot container for an ocean consolidation. The consolidation may be moved under a housebill associated with the logistics platform 110 and smart contracts may be generated and communicated to the various parties involved in the consolidated move in the manner described above.

In aspects, information associated with regulatory compliance capabilities of one or more entities providing logistics services via the logistics platform 110 may be received and stored at the one or more databases 116. This information may include license information associated with an entity authorized to clear freight through customs in one or more jurisdictions, or other licenses. In aspects, information regarding the license(s) may be written to the blockchain ledger. In aspects, regulatory compliance capabilities may further include automatic generation of records for proving up aspects of routings with respect to regulatory requirements, and/or generations documentation for one or more of the aforementioned regulatory compliance checks by the logistics platform.

For example, the Transportation Security Administration (TSA) requires that certain carriers undergo an approval process and obtain a Security Threat Assessment (STA) number. The STA number certifies that the carrier is authorized to handle cargo that is tendered to an air carrier. In aspects, STA numbers for the various entities utilizing the logistics platform 110 may be stored at the one or more databases 116. Additionally, in aspects, this information may be written to one or more blocks of the blockchain in association with the various smart contracts corresponding to each carrier involved in a routing where the carrier is regulated by the STA. The TSA periodically audits logistics service providers, requiring them to prove up that all personnel handling certain types of cargo had a valid STA number. In aspects, an audit report may be automatically generated to provide the required documentation for the audit based on the information written to the appropriate block or blocks of the blockchain (e.g., in a block where the smart contract for the carrier corresponding to the particular STA number is written). In aspects, this report may identify the particular routing(s) for which the report is generated, the carriers involved in each leg of the routings, information identifying the particular person that handled the particular leg of the routing and their STA number, the commodity handled, the pickup and drop off locations, other information, or a combination thereof. Further, because this information is stored in one or more blocks of the blockchain and are traceable, the records containing the information are immutable and present a highly reliable source for obtaining the information. This means that the TSA may trust that the reports accurately reflect the personnel involved in the various routings recorded to the blockchain. Additionally, because these reports are currently performed predominantly by hand, implementing the reporting using the blockchain may reduce the amount of time, cost, and effort required to generate and prove up these reports. In aspects, the STA audit reports may also be written to one or more blocks of the blockchain to provide a persistent record of the information contained therein.

As another example, various information pertaining to import cargo arriving to the United States by vessel or intended to be delivered to a foreign trade zone (FTZ) must be noticed in an Importer Security Filing (ISF). This information must identify: the seller, the buyer, the importer of record or FTZ applicant identification number, consignee number(s), the manufacturer (or supplier), the ship to party, the country of origin, and the commodity harmonized tariff schedule of the United States (HTSUS) number. The ISF must be filed by the importer or party causing the commodity to arrive within the limits of a port in the United States.

For some routings, additional information must be filed. In aspects, this information may be written to one or more blocks of the blockchain in association with the various smart contracts corresponding to each carrier involved in a routing that is subject to reporting an ISF. These ISF filings must be provided to the United States Customs and Border Patrol agency (CBP), and often must be provided prior to the cargo entering a port of the United States. In aspects, the ISF filing may be automatically generated to provide the required documentation to the CBP based on the information written to the appropriate block or blocks of the blockchain (e.g., in a block where the smart contract for the carrier corresponding to the particular leg of the routing is written). In aspects, the ISF report may identify the information described above, and may automatically be provided to the CBP prior to any applicable deadline. For example, a smart contract for a routing that utilizes a boat to transport a commodity to a United States port may be associated with a milestone for receiving the commodity by the carrier operating the boat. This milestone may be further associated with operations (e.g., self-executing code) that cause the ISF filing to be generated once the carrier takes possession of the commodity. In aspects, the operations may further include comparing the information associated with the commodity at the time the smart contract was created to information received from the carrier once the carrier has taken possession of the commodity. For example, if the carrier was originally supposed to receive ten pieces of the commodity, but only received nine, the carrier could provide information to the logistics platform 110 to indicate that the entire shipment was not received, and this information may be written to the blockchain. Thus, when the ISF filing is generated, it may accurately reflect the quantity of the commodity being handled by the carrier. In aspects, the milestone for triggering the generation of the ISF report may also require that the carrier confirm the received commodity (e.g., quantity, weight, size, etc.) prior to generating the ISF report. In aspects, information indicating the commodity was received in full by the carrier, or information identifying any discrepancies in the commodity actually received by the carrier, such as if the carrier receives an incomplete delivery of the commodity, may be written to one or more blocks of the blockchain. Further, because this information is stored in one or more blocks of the blockchain and are traceable, the records containing the information are immutable and present a highly reliable source for obtaining the information. This means that the CBP may trust that the reports accurately reflect the various reported aspects of the commodity and the carrier involved in the routing. Additionally, because these reports are currently performed predominantly by hand, implementing the reporting using the blockchain may reduce the amount of time, cost, and effort required to generate and prove up these reports. Further, because the ISF reports are generated automatically upon achieving a particular milestone of the smart contract associated with the routing, the ISF reports may be generated and timely provided to the CBP. In aspects, the ISF filings may also be written to one or more blocks of the blockchain to provide a persistent record of the information contained therein. It is noted that similar operations may be implemented in smart contracts with respect to export filings.

In a further example, the United States Department of Commerce Bureau of Industry and Security imposes regulations (e.g., Export Administration Regulations (EAR)) that apply to certain aspects of exporting commodities (e.g., goods) outside the United States. Entities that are involved in routings associated such exporting activities may be periodically audited for compliance with EAR, such as to verify that commodities are not being exported to parties identified in a denied party list maintained by this government agency. In aspects, the logistics platform 110 may be configured to generate one or more reports to prove up compliance with EAR and other denied party screening regulations in connection with routings facilitated by the logistics platform 110. In aspects, these reports may identify the party that receives the commodity as a result of a particular routing. For example, a smart contract for a routing that involves export of a commodity outside of the United States may be associated with a milestone configured to trigger operations (e.g., self-executing code) to generate the report once the milestone occurs. Alternatively, information about the buyer/importer may be written to a block of the blockchain and subsequently used to prove up compliance with EAR via generation of a report that indicates that all parties are not identified in a denied party list. In aspects, the operations may further include comparing the buyer/importer to a denied party list to verify that the buyer/importer is not identified therein. If the buyer/importer is identified, the operations may cause the routing to be canceled or placed on a hold until further due diligence can be performed to determine whether the buyer/importer was identified as being included in the denied party list in error. Because this information is stored in one or more blocks of the blockchain and is traceable, the records containing the information are immutable and present a highly reliable source for obtaining the information. This means that the report may be trusted to accurately reflect the various relevant and reported aspects of the routing. Implementing the reporting using the blockchain may reduce the amount of time, cost, and effort required to generate and prove up these reports. Further, because the information provided in these reports is generated automatically upon achieving a particular milestone of the smart contract associated with the routing, these reports may be generated in a timely fashion. In aspects, the denied party reports may also be written to one or more blocks of the blockchain to provide a persistent record of the information contained therein.

As yet another example, carriers operating to transport commodities via ocean vessels are required to report fares for various logistics services. These reports must identify the public rate for the ocean freight sold, what the commodity is, the value of the commodity, and other information. In aspects, this information may be written to one or more blocks of the blockchain, or derived from previously written blocks of the blockchain, such as a block where the smart contract associated with transportation of the commodity by a carrier via a boat is written. As explained above, the timing for generation of this report may be tied to one or more milestones of the smart contract, and may be generated automatically upon completing the one or more milestones. Additionally, as explained above, if aspects of the commodity changed prior to the carrier receiving the commodity (e.g., quantity has changed, etc.), this information may be provided to the logistics platform 110, and the fare report may be updated accordingly. In aspects, the fare report may be written to one or more blocks of the blockchain to provide an immutable record of the report. Additionally, by automatically generating the report based on information included in the blockchain and/or updated information received from the carrier, the report may accurately reflect the relevant information.

In aspects, the logistics platform 110 may be configured to generate confidence information for a plurality of logistic service providers based on analytics information derived from the blockchain ledger. The confidence information may indicate at least one of an on-time delivery rating, regulatory compliance rating, a shipment damaged in transit rating, a shipment lost (in whole or in part) during transit rating, a shipment delayed rating, and the like. In aspects, the logistics platform 110 may account for the confidence information during quote generation, and, may even generate quotes for the transport of the commodity based, at least in part, on the confidence information.

Figure 7:
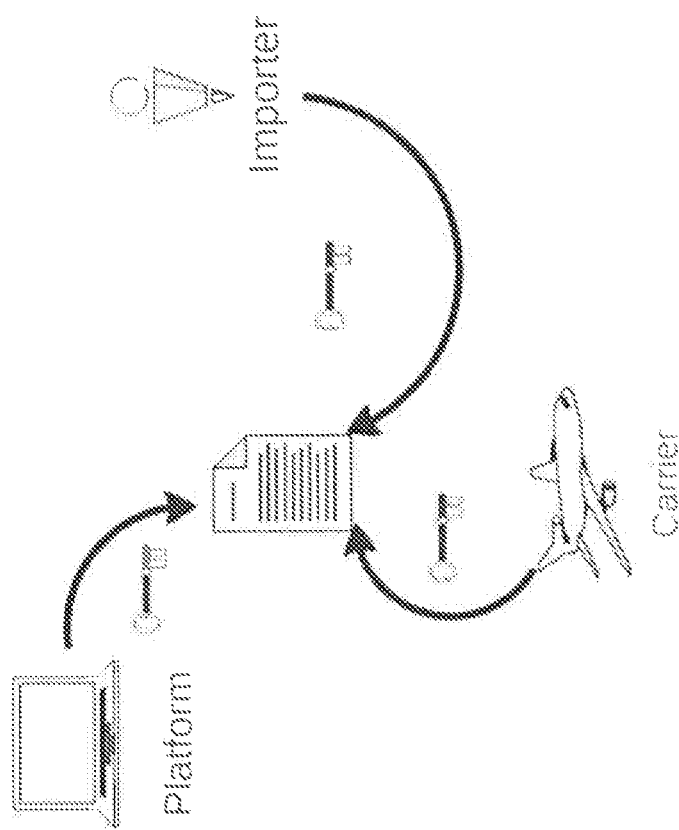
FIG. 7 is a block diagram illustrating aspects of a digital signature process executed during one or more phases of a logistics transaction provided by a logistics platform in accordance with embodiments of the present disclosure.
Figure 8:
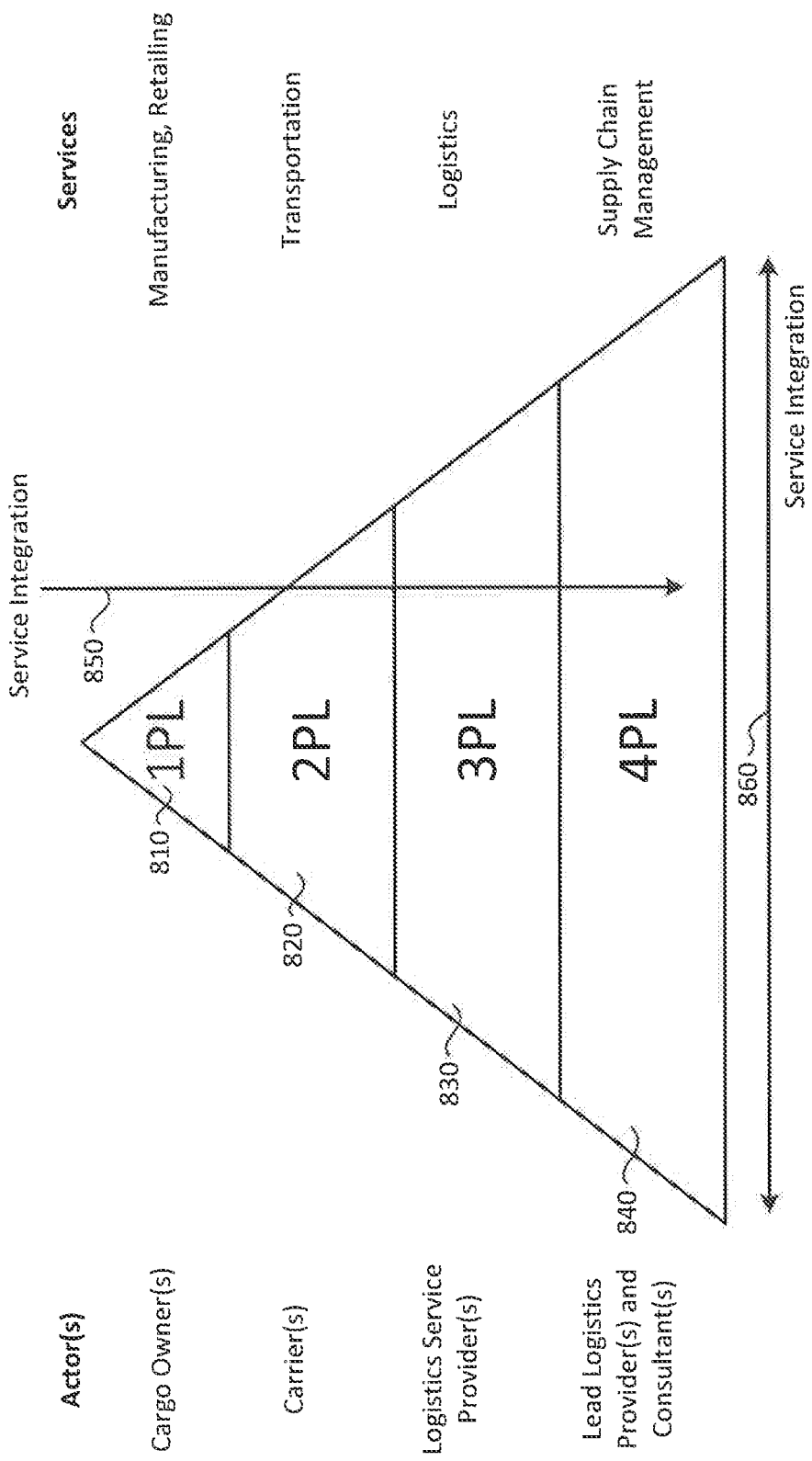
FIG. 8 is a diagram illustrating various actors involved in the logistics industry.
Figure 9:
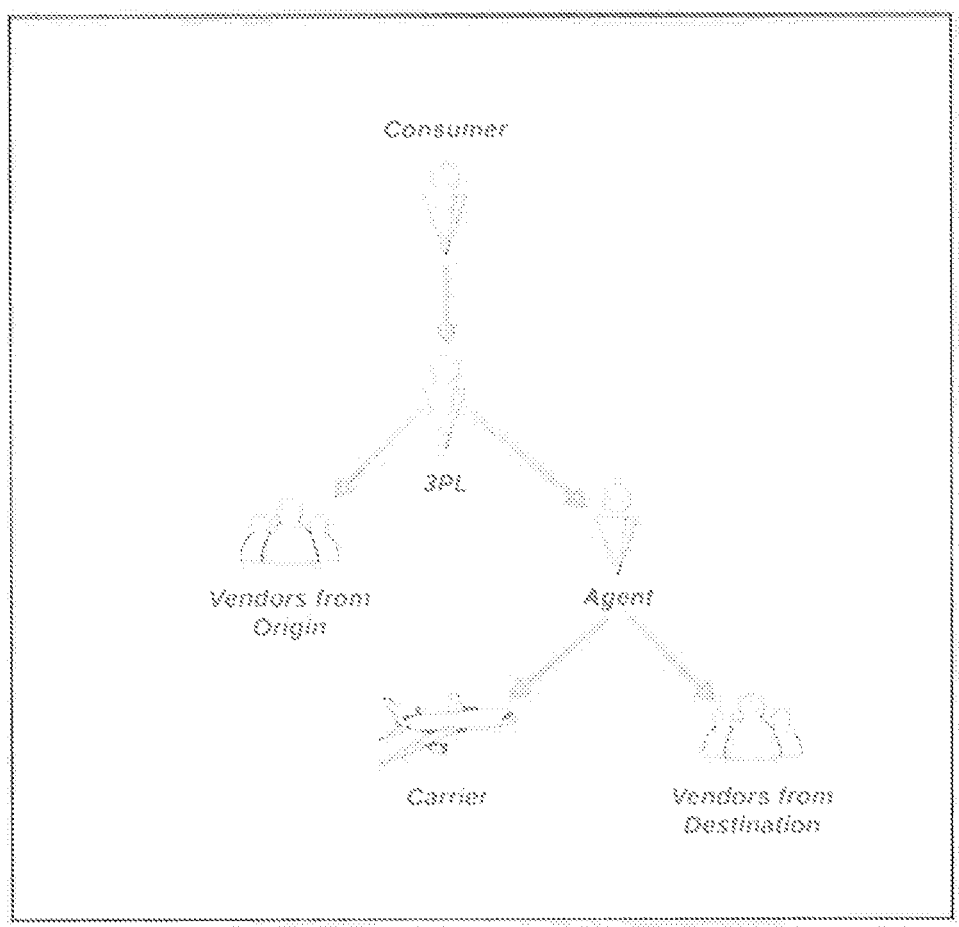
FIG. 9 is a diagram illustrating aspects of a logistics transaction.

In aspects, the logistics platform 110 may facilitate additional confidence instilling mechanisms. For example, in aspects, the logistics platform 110 may implement control procedures for initiating multiple-signature (multisig) transactions/verifications with respect to one or more milestones of a smart contract. FIG. 7 is a block diagram illustrating aspects of a digital signature process executed during one or more phases of a logistics transaction provided by the logistics platform 110 in accordance with embodiments of the present disclosure. Multisig transactions may be transactions that require multiple keys to approve the completion of the transaction. For example and as shown in FIG. 7, in aspects, the logistics platform 110 may generate three keys: one for the provider (e.g., the carrier), one for the consumer (e.g., the party requesting the move), and one for the logistics platform 110. If two of the three keys are applied to a smart contract (e.g., two of the three parties agree the move was completed per the contract), the operations of at least a portion of the smart contract would be executed, as described above. If the two parties cannot agree then the neutral third party, such as the logistics platform 110, may assess the situation and decide whether to execute the smart contract as written, or withhold an agreed upon amount from the service provider for failure to execute the terms of the smart contract. In aspects, the use of the multisig transactions may also be utilized to reverse transactions (e.g., where damage to the commodity was not discovered immediately), and in some instances, payments made upon execution of the operations of the smart contracts may be held for a particular amount of time. The particular amount of time may be a period of time in which a party taking possession of commodity from another party has an opportunity to inspect the commodity and object to the amount paid if any damage is discovered. After the expiration of the period of time, the delivering party may be paid in full if the receiving party fails to inspect and notice the damage in time. In the example of FIG. 7, an air-based carrier is operating to transport a commodity on behalf of an importer (e.g., the consumer to which the commodity are to be delivered or the party that requested the transport of the commodity).

Figure 10:
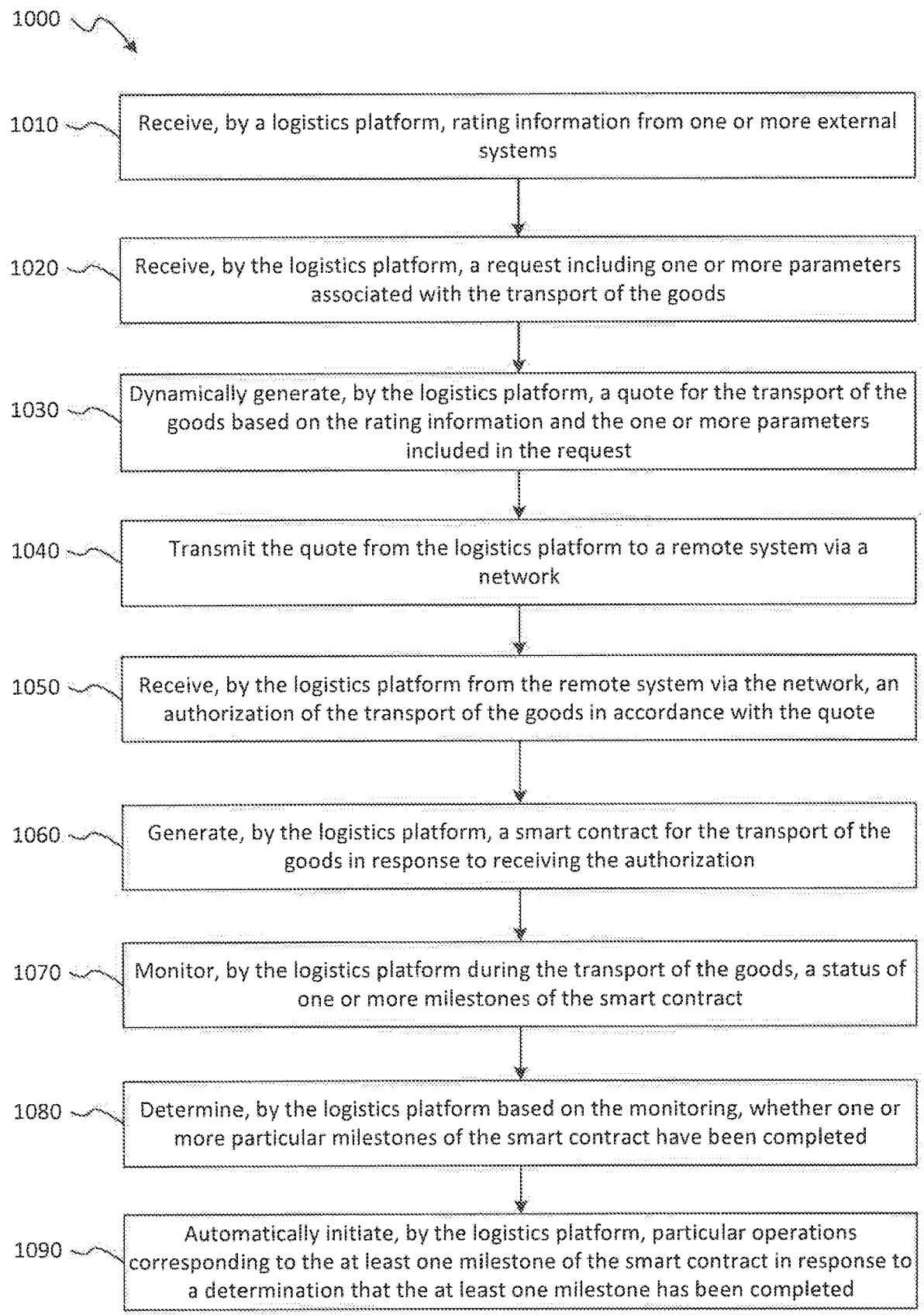
FIG. 10 is a flow diagram of an exemplary method for performing logistics operations in accordance with embodiments of the present disclosure.

Referring to FIG. 10, a flow diagram of an exemplary method for managing transport of a commodity from a point of origin to a destination in accordance with embodiments of the present disclosure is shown as a method 1000. In aspects, the method 1000 may be stored as instructions (e.g., the instruction 115 of FIG. 1), which may be executed by processors 112 of the logistics platform 110 to perform operations for providing and managing logistics services, as described above.

At 1010, the method 1000 includes receiving, by a logistics platform, rating information from one or more external systems, each of the one or more external systems associated with a logistics service provider. In aspects, the rating information received from the external systems may include information that identifies costs for one or more transportation services, container sizes available for the one or more transportation services, lanes accessible to the logistics service provider, information associated with regulatory compliance capabilities of the logistics service provider, points of origin and destinations serviced by the logistics service provider, time estimates associated with transport of a commodity from the points of origin to the destinations serviced by the logistics service provider, other information, or a combination thereof. At 1020, the method 1000 includes receiving, by the logistics platform, a request including one or more parameters associated with the transport of the commodity.

At 1030, the method 1000 includes dynamically generating, by the logistics platform, a quote for the transport of the commodity based on the rating information and the one or more parameters included in the request. As explained above, in aspects, the logistics platform may generate one or more quotes, and each of the one or more quotes may be associated with one or more logistics service providers (e.g., carriers and vendors) that are to perform logistics services with respect to at least a portion of the transport of the commodity. The logistics platform may be configured to generate the one or more quotes based on the rating information and the parameters of the requested logistics transaction, as described above with respect to FIGS. 1 and 2.

At 1040, the method 1000 includes transmitting the quote(s) from the logistics platform to a remote system via a network. The remote system may correspond to a system operated by the consumer requesting the transport of the commodity. At 1050, the method 1000 includes receiving, by the logistics platform from the remote system via the network, an authorization of the transport of the commodity in accordance with the quote. In aspects where more than one quote is generated, the authorization may indicate a particular quote of the one or more quotes that has been selected by the consumer. At 1060, the method 1000 includes generating, by the logistics platform, a smart contract for the transport of the commodity in response to receiving the authorization. In aspects, the smart contract may include one or more milestones and one or more operations that are automatically executed by the logistics platform in response to a determination that at least one of the milestones of the smart contract has been completed, as described above with reference to FIGS. 1-6. In aspects, generating the smart contract may include generation of a plurality of smart contracts, where each of the smart contracts is associated with a particular logistics service provider (e.g., a carrier, a vendor, and the like) that is responsible for one or more aspects of the transport of the commodity, and the milestones included in each of the smart contracts may be tailored to the specific actions to be carried out by each of the logistics service providers associated with each smart contract. The operations associated with one or more milestones of a smart contract may include operations for initiating payment to a logistics service provider in response to a determination that a particular milestone of the smart contract has been completed, as described above. In aspects, the operations incorporated into each of the smart contracts may comprise self-executing code, as described above.

At 1070, the method 1000 includes monitoring, by the logistics platform during the transport of the commodity, a status of the milestones of the smart contract to determine whether one or more of the milestones has been completed. At 1080, the method 1000 includes determining, by the logistics platform based on the monitoring, whether one or more particular milestones of the smart contract(s) have been completed. In aspects, a milestone may be determined to be completed based on a confirmation message received from one or more logistics service providers, as described above. In aspects, the confirmation messages may include a digital signature corresponding to a particular one of the one or more logistics service providers. At 1090, the method 1000 includes automatically initiating, by the logistics platform, particular operations corresponding to the at least one milestone of the smart contract in response to a determination that the at least one milestone of the smart contract has been completed. As explained above, in aspects, the operations may include initiating payment to a particular logistics service provider in response to a determination that the particular logistics service provider has completed one or more portions of the transport of the commodity. In aspects, multisig transactions may be implemented by the logistics platform. In such instances, a determination of whether a milestone has been completed may include determining, by the logistics platform, a number of received confirmation messages that indicate a milestone has been completed with respect to the smart contract, and determining, whether the number of received confirmation messages satisfies a threshold. If the number of confirmation messages received satisfies the threshold, the logistics platform may determine that a particular milestone of the smart contract has been completed, an may initiate the operations associated with the particular milestone, such as providing payment to a logistics service provider. As explained above, implementing multisig transactions may improve the operations of the logistics process by allowing an entity in the transportation chain to withhold their signature if the commodity are damaged prior to the entity taking possession of the commodity, thereby imposing accountability constraints on the parties involved in a transport of commodity according to embodiments of the present disclosure. Additionally, as explained above, in aspects, as various milestones of the smart contracts are completed, the logistics platform may update a blockchain ledger that includes the smart contract(s).

In aspects, the method may include receiving, by the logistics platform, regulatory compliance information associated with the transport of the commodity. This may include information indicating that particular shipments have cleared customs, duties and taxes on the transport of the commodity have been paid, or other information. In aspects, the method may include generating one or more regulatory compliance reports. For example, a report may be generated by the logistics platform that identifies all entities that have handled the transport of the commodity, and this report may be provided to a government agency as part of a regulatory compliance procedure. In aspects, copies of documents generated during regulatory compliance aspects of a transport of a commodity may be received by the logistics platform and added to the blockchain ledger of one or more entities involved in the transport of the commodity, such as entries associated with the consumer and entries associated with the party performing regulatory compliance operations.

Figure 11:
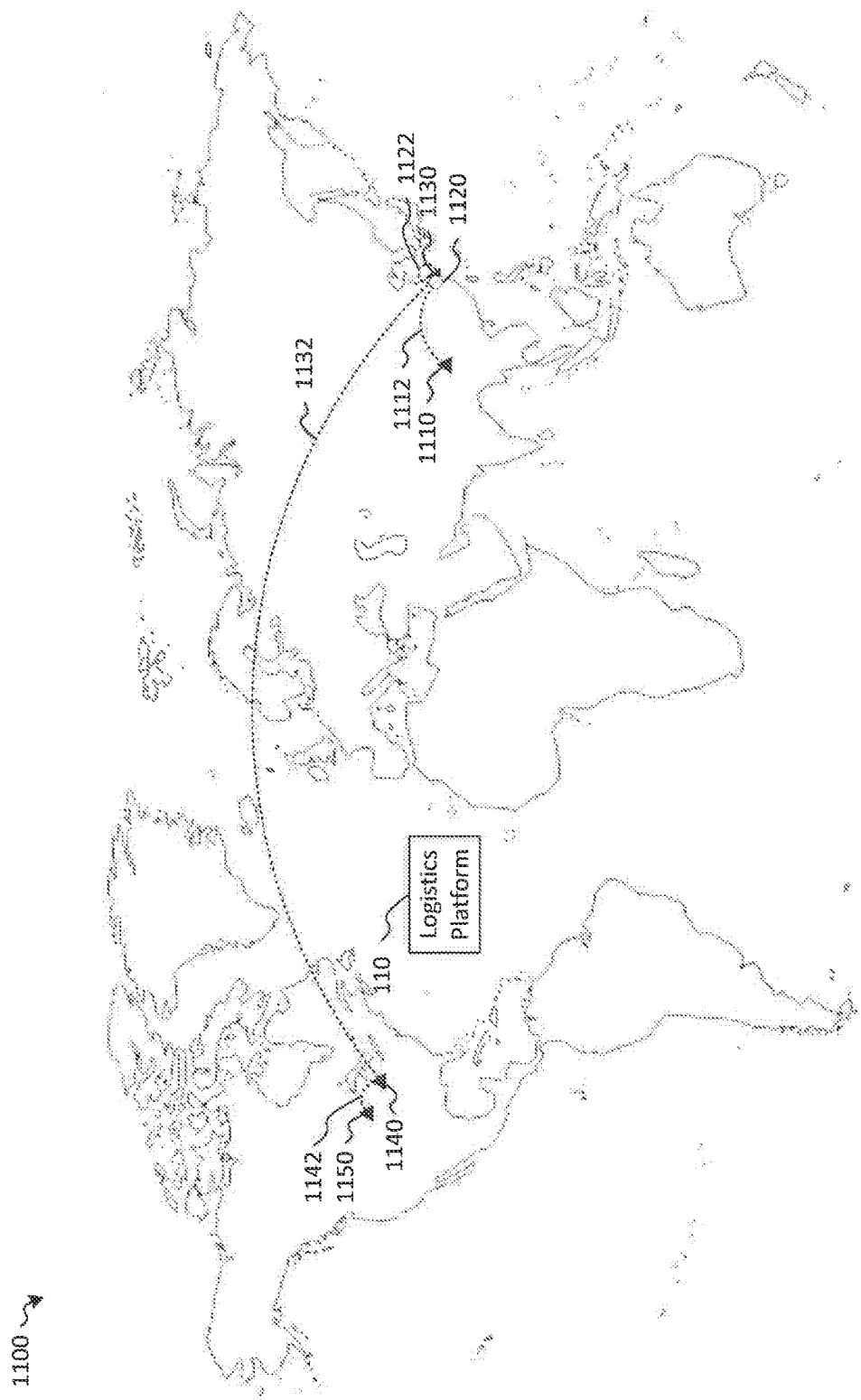
FIG. 11 is a diagram illustrating a detailed view of a routing implemented in accordance with embodiments of the present disclosure.

Referring to FIG. 11, a diagram illustrating a detailed view of a routing implemented in accordance with embodiments of the present disclosure is shown as a routing 1100. In the example illustrated in FIG. 11, an importer situated in the United States has a shipment of a telecommunications product from a vendor ready for pickup in Chengdu China. As described above with reference to FIG. 2, the importer may access the logistics platform 110 to provide a request including parameters for the shipment. In aspects, the importer may provide the request to the logistics platform 110 via an application configured to communicate information between the importer and logistics platform. For example, the application may be a standalone application provided by the operator of the logistics platform 110 that is executing on a computing device of the importer, such as the importer system 120 of FIG. 1, where the application is configured to exchange information with the logistics platform 110 (e.g., via an application programming interface of the logistics platform 110). As another example, the application may be a web-based application accessed by the importer via a web browser executing on the computing device of the importer. In aspects, the application may be a distributed application having its backend distributed and running on a decentralized peer-to-peer network.

To provide the request, the importer may login into the application and navigate to a request routing interface configured to receive inputs corresponding to parameters of the requested routing. As explained above, the input parameters may identify the weight, dimensions, location, ready date (e.g., the date when the telecommunication product will be ready for pickup), and a requested delivery date for delivering the telecommunications product to a warehouse in Minneapolis, Minn. After providing the input parameters via the request routing interface, the user may submit the request to the logistics platform 110.

After the request is received, the logistics platform 110 analyzes information maintained in one or more databases (e.g., the one or more databases 116 of FIG. 1) to identify various combinations of carriers that may be utilized to handle the shipment of the telecommunications product from Chengdu, China to Minneapolis, Minn. As explained above, in aspects, the analyzed information may include the rating information, which may provide insight into carriers that can handle one or more portions of the routing. As a result of the analysis, the logistics platform may return a variety of routing options. The routing options will have various legs, from one asset-based service provider to another, and eventually to the door of the consumer in Minneapolis. In this particular example, the shipment is urgent, and the consumer selects delivery within five to seven days and that the freight is ready now.

The fastest routing returned is made up of four different quotes from four different service providers, each service provider handling a particular leg of the routing. In this example, the four different legs include: a first leg including transport of the telecommunications content from Chengdu to a warehouse in Shanghai in a less than truck load rate may correspond to a first asset-based service provider; a second asset-based service provider may be associated with a second leg for transport of the telecommunication product to an airport drop from the warehouse in Shanghai to a third asset-based service provider (e.g., an air carrier); a third leg including transport of the telecommunications product by the third asset-based service provider via air from Shanghai to Chicago, Ill.; and a fourth leg provided by a fourth asset-based service provider that includes picking up the telecommunications content from the Chicago airport terminal and delivering to the consignee's door in Minneapolis, thereby completing the routing.

This scenario is illustrated in FIG. 11, where the first leg is indicated is indicated by line 1112 and includes pickup of the telecommunications product at a starting point 1110 in Chengdu, China and delivering the telecommunications product to the warehouse in Shanghai, indicated by point 1120. The second leg is shown at 1122 and includes transporting the telecommunications product from the warehouse 1120 to an air carrier indicated by point 1130. The air carrier 1130 then transports the telecommunications product via air along the third leg 1132 to an airport in Chicago, indicated by point 1140. Then, the fourth asset-based service provider then transports the telecommunications product over the fourth leg 1142 to the destination (e.g., the warehouse in Minneapolis) indicated by point 1150. As shown in FIG. 11, the first leg It is noted that the routing options provided to the importer could include various other routing options where perhaps the flight does not go from Shanghai to Chicago, but rather booking via the carrier direct to Minneapolis with a different cost. The freight would then be ready to be picked up locally for delivery rather than by a trans-state asset based service provider. In aspects, the exact routing and vendor selection may be spliced to create the routing that is most advantageous, in any regard (e.g., price, timing, communication, and the like), for the consumer. The routing, once confirmed as the preferred routing, may be saved to a profile associated with the importer and may indicate the rates quoted from the inputs populated in the system (e.g., the rating information) by the various different asset-based service providers. Once the consumer decides to pull the trigger and initiate the move, they would "accept" the quote which would then submit the accepted routing back to the logistics platform 110. At this point, the logistics platform 110 may take input of a routing, made of various quotes, to identify the key milestones that may serve as the goalposts for the smart contracts it generates.

In aspects, the dynamically generated smart contracts may be connect the "wallets" of the consumer and the various service providers by being self-actuating code upon completion of the milestones per the routing that was quoted and established. The self-actuating code may be generated from an auto-generation module in the logistics platform 110. In aspects, the auto-generation module may be embodied as instructions (e.g., a portion of the instructions 115 of FIG. 1), and may utilize precoded language tailored around the milestones determined for the routing by the consumer as well as the rates applied to the various services and lanes via the platforms API for service producers. The milestones would not act in isolation for one leg of the routing, but rather would act as a conduit connecting the various quotes together. For example, in aspects, the milestone starting the move for one asset-based service provider could be the milestone that triggers the completion of the smart contract for another asset-based service provider.

Aspects for monitoring milestones and executing operations of the smart contracts to which those milestones correspond upon completion of one or more milestones are described below. In aspects, smart contracts may be associated with at least a starting milestone (e.g., one or more criteria for determining that the asset-based service provider has started to perform the contracted move) and a completion milestone (e.g., one or more conditions that indicate the asset-based service provider has completed the contracted move). For example, a starting milestone associated with the smart contract for the first leg 1112 of the routing 1110 may correspond to picking up of the freight from the shipper's warehouse 1110 by the first asset-based carrier. Upon arriving at the warehouse 1110, the operator of the warehouse may obtain the signature of the first asset-based carrier, signifying that the first asset-based carrier has taken possession of the telecommunications product. In aspects, this signature may be a digital signature or may include a physical signature on a paper document. In aspects, this signature may be uploaded to the logistics platform, which may include a picture of a physical signature, and would signify to the logistics platform that the first milestone has been completed. This informs the logistics platform that the transport of the telecommunications product along the first leg 1112 has been started (e.g., the starting milestone criteria have been satisfied). In aspects, the signature itself may be a genesis milestone, and the logistics platform 110 may act as an "Oracle" to feed contextual information into the smart contract to allow for its prewritten conditions to self-actuate, as described above.

A completion milestone associated with the smart contract for the first leg 1112 of the routing 1110 may correspond to receiving confirmation that the first asset-based carrier has moved the telecommunications product from the shipper's warehouse 1110 to the second asset-based service provider's warehouse 1120, located in Shanghai. As described above, completion of the first leg 1112 may be confirmed via a signature process, where the logistics platform 110 receives the signature and verifies that the completion milestone conditions have been completed successfully. In aspects, the completion milestone may further include conditions associated with uploading, by the first asset-based service provider, a digital or physical bill of lading (BOL) for the transport from Chengdu to Shanghai to the logistics platform 110. In aspects, the submission of the BOL, and any notation of freight condition (e.g., damage to the shipment, missing pieces of the shipment, etc.), may then trigger the completion or at least notification to the key holders of the multisig transaction that the final milestone for the first asset-based service provider has been completed.

The second leg 1122 may include a starting milestone that is triggered or completed once the signature of the bill of lading for the "Pickup" or "Linehaul" is signed by the second asset-based service provider and control of the shipment is confirmed as such. This may signify that the second quotation in the routing has commenced. In aspects, this milestone may be completed upon reception of the telecommunications product at their warehouse 1120. A completion milestone for the second leg 1122 may be associated with reception of a BOL regarding the transport from warehouse 1120 to the airport drop location 1130, and reception of the BOL may indicate that the second leg of the move is complete. In aspects, the reception of the BOL from the second asset-based service provider may be a completion milestone that is completed upon the signature of the BOL between the second asset-based carrier and the third asset-based carrier (e.g., the airline or their general services administration (GSA)).

The third leg 1132 may include a starting milestone that is triggered upon receiving the signature from the second asset-based service provider that the third asset-based service provider has taken control of the freight as it was tendered to the them. In aspects, the starting milestone may be associated with operations to generate one or more reports, such as an ISF report associated with transport of the telecommunications product to the United States, and to provide those reports to the appropriate government agencies (e.g., for regulatory compliance purposes). In aspects, the generation of the reports may be associated with earlier milestones, which may be beneficial when the reports need to be provided a threshold amount of time (e.g., twenty four hours or another period of time) in advance of the freight arriving in the United States or another country. In aspects where the report is generated and provided to the appropriate government agency prior to the commodity being received by the carrier that will ultimately deliver the commodity to the country regulated by the government agency, the operations of the smart contract for that carrier may include verifying that the information included in the previous report is accurate (e.g., the quantity of the commodity has not changed, etc.), and, if discrepancies are discovered, generating a supplemental report to the government agency to notify them of the change. In this example, a completion milestone for the third leg 1132 may be associated with arrival of the telecommunications product at the destination (e.g., the airport 1140) and issuance of a notice of arrival by the third asset-based carrier to the consignee of the master airway bill.

The fourth leg 1142 may include a starting milestone that is triggered upon notification that the shipment has been delivered to the agent of the consignee and/or the upload of the BOL to the logistics platform 110. In aspects, either a system of the third asset-based service provider or the logistics platform 110 may act as the oracle adding the contextual information necessary to self-actuate the operations of the smart contract or alert the key holders of the multisig transaction. The completion milestone for the move may be associated with reception of a signature, as described above, by the logistics platform 110 that indicates the consignee's reception of the freight and the completion of the entire routing 1100.

In various aspects of the routing 1100 described above, the logistics platform may operate as an "Oracle" to provide contextual information to one or more of the smart contracts during one or more portions of the routing 1100. For example, the logistics platform 1110 may receive information from a particular asset-based carrier and may provide that information to a smart contract stored in the blockchain to determine whether that information indicates a result of a milestone included in the smart contract has been completed. The logistics platform 110 may then determine a result of the milestone completion check. If the result indicates that the milestone is complete, the logistics platform 110 may sign the result with a key. This signed result may then be provided back to the smart contract, which may trigger the operations of the smart contract associated with the completed milestone. In aspects, the operations may result in additional blocks being written to the blockchain. These additional blocks may be associated with payments to one or more of the asset-based service providers. For example, in the routing 1100, upon determining that the completion milestone for the first leg 1112 has been completed, operations may be initiated to automatically provide payment to the first asset-based carrier for their services in transporting the telecommunications product to the warehouse 1120. In aspects, notes associated with various aspects of the routing 1100 may also be written to the blockchain. For example, one of the asset-based service providers may notice that some of the telecommunications product may have been damaged (e.g., a hole in a box) during a prior leg of the routing 1100, and may note this observation to the logistics platform 110. This information may be written to one or more blocks of the blockchain.

In the example above, the first asset-based service provider may access the logistics platform 110 using the application and input its rates per CBM or per KG, whichever is greater per the agreed upon equation of the platform for that region (i.e., 1000 KG=1 CBM), and per mile. The rate is then able to return quotes for shippers looking to move freight from one zip code or address to another in certain lanes. For example, if 1000 KGs is being moved from Chengdu to Shanghai, as in the routing 1110, the rate may be determined as:

$$rate = X.xx * Weight/Volume * Distance.$$

Once quotes are generated per the asset-providers rating, they may be accepted. In example provided above, the rate may be quoted, accepted, and dispatched to the asset-based service provider by the consumer as a delivery order or BOL, which may be associated with an underlying smart contract including milestones and operations, indicated in the quote and on the bill of lading, the operations corresponding to one or more of the milestones may be automatically completed, such as to provide payment to the first asset-based service provider, upon completion of the corresponding milestones, as described above.

In the example above, the second asset-based service provider may input its rates in a similar manner to the first asset-based service provider, but per a service of airport drop. Depending on the region, this charge may simply be calculated as:

$$Weight/Volume * \text{a standard rate},$$

where the standard rate may be 1000 KGS at 0.05 per KG for an airport drop in Shanghai, for example. Once the routing 1100 is generated, the second asset-based service provider may be notified of the move, the parties involved, and the milestones required of them to actuate the smart contract, as described above. When the freight is received, the second asset-based service provider's signature may act as one key in the multisig transaction and serve to notify the logistics platform 110 and may serve to notify the logistics platform 1110 and/or other key holders of its application.

In the example above, the third asset-based service provider (e.g., the airline) may input its rates in the particular lanes for the platform via the application in a manner similar to the first asset-based service provider. In aspects, there may be additional charges or limitations (e.g., parameters particular to air freight). Similar to the second asset-based service provider, the third asset-based service provider may be notified of the move, the parties involved, and the milestones required of them to actuate the operations of the smart contract (e.g., receive the telecommunications products from the second asset-based service provider and deliver them to the fourth asset-based service provider). When the freight is received from the second asset-based service provider, the third asset-based service provider vendor's signature may act as one key in a multisig transaction and may serve to notify the logistics platform 1110 and/or other key holders of its application.

The life of the fourth asset-based service provider would mirror the life cycle described above with respect to the first asset-based service provider. For example, the fourth asset-based service provider may inputting rates into a rating structure and then follow the chain of the second and third asset-based service providers by being notified that the routing 1100 that had been accepted. In aspects, the notification may identify the portions of the routing 1100 that the fourth asset-based service provider will participate in, the others involved, and the milestones that outline the smart contract that would result in their compensation.

As shown above, implementation of logistics services via the system 100 of FIG. 1, which utilizes blockchain technology to record routings and smart contracts associated therewith, provides numerous improvements to the logistics industry. In one aspect, improvements of the system 100, as described above with reference to FIGS. 1-7, 10, and 11, may include increased trust between parties involved in logistics operations. For example, as opposed to present systems where 3PLs and other vendors having established relationships with various asset-based service providers are required, the system 100 facilitates direct transactions between asset-based service providers, shippers, and consignees that are geographically distributed across the world without the need for a 3PL or other intermediary party to be involved. This may significantly reduce the costs associated with various logistics services because, as explained above, involvement of 3PLs and agents results in margins or markups to the costs of the logistics services they arrange on behalf of a consignee. For example, Table 1 below illustrates exemplary markups that may be applied to particular logistics services as a result of involvement of a 3PL and/or agent.

TABLE 1

| Logistics Service | Markup |
|---|---|
| Air drop (e.g., pickup from a warehouse and delivery to an air carrier) | 7-10% |
| Airport-to-airport | 18% |

As shown in Table 1, above, elimination of the 3PLs and/or agents through use of the logistics platform may result in savings of approximately 25-28% for consignees with respect to costs of some routings. One aspects of the logistics platform 110 that makes these savings possible is the implementation of the blockchain technology described above and the use of smart contracts comprising self-actuating operations at various milestones of a routing, as described above. Because these smart contracts are written to the blockchain and are immutable, this creates trust between the parties that each party will fulfill their obligations, even where the parties to a routing have never worked with each other before and are located in disparate geographies.

Additionally, the system 100 further improves systems for serving the logistics industry through creation of documentation utilized in various aspects of routings. For example, BOLs, manifests, airway bills, and other documentation exchanged between the entities involved in a routing may be automatically created by the logistics platform 110 and written to one or more blocks of the blockchain. Additionally, these documents may be tied to one or more milestones of the various smart contracts associated with the routing so that they are automatically generated at particular points in the routing and then provided to the relevant parties for various purposes. Further, as described above, the logistics platform 110 may improve the ability of the various parties to prove up compliance with various regulatory requirement imposed on the asset-based service providers, such as generating ISF reports, TSA audit reports, fare filings, denied party screening compliance, and the like. Further, the generation of these various reports may be tied to particular milestones of the smart contracts involved in the routing so that the reports are timely generated, as described above.

Although the embodiments of the present disclosure and their advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method for managing transport of a commodity from a point of origin to a destination, the method comprising:
   receiving, by a logistics platform, rating information from one or more external systems, each of the one or more external systems associated with a logistics service provider;
   receiving, by the logistics platform, a request including one or more parameters associated with the transport of the commodity;
   dynamically generating, by the logistics platform, a quote for the transport of the commodity based on the rating information and the one or more parameters included in the request;
   transmitting the quote from the logistics platform to a remote system via a network;
   receiving, by the logistics platform from the remote system via the network, an authorization of the transport of the commodity in accordance with the quote;
   in response to receiving the authorization, generating, by the logistics platform, a smart contract for the transport of the commodity, wherein the smart contract comprises one or more milestones and one or more operations and is generated in response to receiving the authorization from the remote system, wherein the smart contract is recorded to a blockchain ledger and at least one operation of the one or more operations is automatically executed via the smart contract in response to a determination that at least one of the milestones of the smart contract has been completed;
   monitoring, via the blockchain, a status of the milestones of the smart contract during the transport of the commodity;
   determining, via the smart contract based on the monitoring, whether one or more particular milestones of the smart contract have been completed based on whether a quantity of confirmation messages received from one or more logistics service providers responsible for transport of the commodity satisfies a threshold, wherein each of the confirmation messages corresponds to one of the one or more logistics service providers and includes a digital signature generated using a key specific to the corresponding logistic service provider, wherein the confirmation messages indicate changes to a current location of the commodity along a transportation route used for the transport of the commodity and a current service provider in possession of the commodity; and
   in response to a determination that at least one of the one or more particular milestones of the smart contract has been completed, automatically initiating, via the smart contract, particular operations corresponding to the at least one milestone of the smart contract.

2. The method of claim 1, wherein the one or more parameters comprise a size of a container required for the transport of the commodity, information identifying the commodity, a point of origin corresponding to a starting point for the transport of the commodity, a destination for the commodity, a preferred lane for the transport of the commodity, a time constraint for delivering the commodity to the destination, or a combination thereof.

3. The method of claim 2, wherein rating information received from a first external system associated with a first logistics service provider comprises information that identifies a cost for one or more transportation services, container sizes available for the one or more transportation services, lanes accessible to the first logistics service provider, information associated with regulatory compliance of the first logistics service provider, points of origin and destinations serviced by the first logistics service provider, time estimates associated with transport of a commodity from the points of origin to the destinations serviced by the first logistics service provider, or a combination thereof.

4. The method of claim 1, wherein the smart contract is associated with a first logistics service provider and includes a first milestone corresponding to delivery of the commodity to a particular location by the first logistics service provider and an operation for initiating payment to the first logistics service provider in response to a determination that the first milestone of the smart contract has been satisfied, the method further comprising:
  determining whether the first milestone of the smart contract has been completed; and
  in response to a determination that the first milestone of the smart contract has been completed, automatically executing the operation for initiating payment to the first logistics service provider.

5. The method of claim 4, wherein a second logistics service provider receives the commodity from the first logistics service provider, the method further comprising:
  receiving, from the second logistics service provider, information associated with initiation of the transport of the commodity by the second logistics service provider, wherein the determination that the first milestone of the smart contract has been completed is based on the information associated with initiation of the transport of the commodity by the second logistics service provider.

6. The method of claim 1, the method comprising: receiving, by the logistics platform, regulatory compliance information associated with the transport of the commodity;
  and updating the blockchain ledger based on the regulatory compliance information.

7. The method of claim 6, the method comprising:
  generating, by the logistics platform, confidence information for a plurality of logistic service providers based on analytics information derived from the blockchain ledger, wherein the confidence information indicates at least one of an on-time delivery rating, regulatory compliance rating, a shipment damaged in transit rating, a shipment lost in transit rating, and a shipment delayed rating; and
  generating the quote for the transport of the commodity based, at least in part, on the confidence information.

8. A non-transitory computer-readable medium storing instructions that, when executed by one or more processors, cause the one or more processors to perform operations for managing transport of a commodity from a point of origin to a destination, the operations comprising:
  receiving rating information from one or more external systems, each of the one or more external systems associated with a logistics service provider;
  receiving a request including one or more parameters associated with the transport of the commodity;
  dynamically generating a quote for the transport of the commodity based on the rating information and the one or more parameters included in the request;
  transmitting the quote from the logistics platform to a remote system via a network;
  receiving the remote system via the network, an authorization of the transport of the commodity in accordance with the quote;
  in response to receiving the authorization from the remote system via the network, generating a smart contract for the transport of the commodity, wherein the smart contract comprises one or more milestones and one or more operations and is generated in response to receiving the authorization from the remote system, wherein the smart contract is recorded to a blockchain ledger and at least one operation of the one or more operations is automatically executed via the smart contract in response to a determination that at least one of the milestones of the smart contract has been completed;
  monitoring, via the blockchain, a status of the milestones of the smart contract during the transport of the commodity;
  determining, via the smart contract based on the monitoring, whether one or more particular milestones of the smart contract have been completed based on whether a quantity of confirmation messages received from one or more logistics service providers responsible for transport of the commodity satisfies a threshold, wherein each of the confirmation messages corresponds to one of the one or more logistics service providers and includes a digital signature generated using a key specific to the corresponding logistic service provider, wherein the confirmation messages indicate changes to a current location of the commodity along a transportation route used for the transport of the commodity and a current service provider in possession of the commodity; and
  in response to a determination that at least one of the one or more particular milestones of the smart contract has been satisfied, automatically initiating, via the smart contract, particular operations corresponding to the at least one milestone of the smart contract.

9. The non-transitory computer-readable medium of claim 8, wherein the one or more parameters comprise a size of a container required for the transport of the commodity, information identifying the commodity, a point of origin corresponding to a starting point for the transport of the commodity, a destination for the commodity, a preferred lane for the transport of the commodity, a time constraint for delivering the commodity to the destination, or a combination thereof.

10. The non-transitory computer-readable medium of claim 9, wherein rating information received from a first external system associated with a first logistics service provider comprises information that identifies a cost for one or more transportation services, container sizes available for the one or more transportation services, lanes accessible to the first logistics service provider, information associated with regulatory compliance of the first logistics service provider, points of origin and destinations serviced by the first logistics service provider, time estimates associated with transport of the commodity from the points of origin to the destinations serviced by the first logistics service provider, or a combination thereof.

11. The non-transitory computer-readable medium of claim 8, wherein the smart contract is associated with a first logistics service provider and includes a first milestone corresponding to delivery of the commodity to a particular location by the first logistics service provider and an operation for initiating payment to the first logistics service provider in response to a determination that the first milestone of the smart contract has been satisfied, the operations comprising:
  determining whether the first milestone of the smart contract has been completed; and
  in response to a determination that the first milestone of the smart contract has been completed, automatically executing the operation for initiating payment to the first logistics service provider.

12. The non-transitory computer-readable medium of claim 11, wherein a second logistics service provider receives the commodity from the first logistics service provider, the operations comprising:
  receiving, from the second logistics service provider, information associated with initiation of the transport of the commodity by the second logistics service provider, wherein the determination that the first milestone of the smart contract has been completed is based on the information associated with initiation of the transport of the commodity by the second logistics service provider.

13. A system for managing transport of a commodity from a point of origin to a destination, the system comprising:
  one or more processors configured to:
    receive rating information from one or more external systems, each of the one or more external systems associated with a logistics service provider;
    receive a request including one or more parameters associated with the transport of the commodity;
    dynamically generate a quote for the transport of the commodity based on the rating information and the one or more parameters included in the request;
    transmit the quote to a remote system via a network;
    receive, from the remote system via the network, an authorization of the transport of the commodity in accordance with the quote;
    in response to receiving the authorization from the remote system via the network, generate a smart contract for the transport of the commodity, wherein the smart contract comprises one or more milestone and one or more operations and is generated in response to receiving the authorization from the remote system, wherein the smart contract is recorded to a blockchain ledger and at least one operation of the one or more operations is automatically executed via the smart contract in response to a determination that at least one of the one or more milestones of the smart contract has been completed;
    monitor a status of the one or more milestones of the smart contract during transport of the commodity;
    determine, via the smart contract, whether one or more particular milestones of the smart contract have been completed based on the monitoring and whether a quantity of confirmation messages received from one or more logistics service providers responsible for transport of the commodity satisfies a threshold, wherein each of the confirmation messages corresponds to one of the one or more logistics service providers and includes a digital signature generated using a key specific to the corresponding logistic service provider, wherein the confirmation messages indicate changes to a current location of the commodity along a transportation route used for the transport of the commodity and a current service provider in possession of the commodity; and
    in response to a determination that at least one of the one or more particular milestones of the smart contract has been satisfied, automatically initiating, via the smart contract, particular operations corresponding to the at least one milestone of the smart contract; and
  a memory coupled to the one or more processors.

14. The system of claim 13, wherein the one or more parameters comprise a size of a container required for the transport of the commodity, information identifying the commodity, a point of origin corresponding to a starting point for the transport of the commodity, a destination for the commodity, a preferred lane for the transport of the commodity, a time constraint for delivering the commodity to the destination, or a combination thereof.

15. The system of claim 13, wherein initiating particular operations corresponding to the at least one milestone of the smart contract comprises generating at least one report configured to establish compliance with one or more governmental regulations imposed on at least a portion of the transport of the commodity, wherein the at least one report is generated by:
  determining one or more reporting requirements associated with the one or more governmental regulations; and
  retrieving information from one or more sources based on the one or more reporting requirements, the one or more sources comprising a database maintained at the memory, one or more smart contracts written to the blockchain ledger, or a combination thereof.

* * * * *